US012401164B2

(12) United States Patent
Gerber et al.

(10) Patent No.: US 12,401,164 B2
(45) Date of Patent: Aug. 26, 2025

(54) PLUG CONNECTOR DEVICE

(71) Applicant: Reichle & De-Massari AG, Wetzikon (CH)

(72) Inventors: Matthias Gerber, Rüti (CH); Thomas Graf, Pfaeffikon (CH); Peter Hollenstein, Wagen (CH); Hans Andres, Hinwil (CH)

(73) Assignee: REICHLE & DE-MASSARI AG, Wetzikon (CH)

( * ) Notice: Subject to any disclaimer, the term of this patent is extended or adjusted under 35 U.S.C. 154(b) by 17 days.

(21) Appl. No.: 17/656,168

(22) Filed: Mar. 23, 2022

(65) Prior Publication Data

US 2022/0311193 A1 Sep. 29, 2022

(30) Foreign Application Priority Data

Mar. 23, 2021 (DE) ........................ 10 2021 107 183

(51) Int. Cl.
*H01R 24/64* (2011.01)
*H01R 13/58* (2006.01)
(Continued)

(52) U.S. Cl.
CPC ........... *H01R 24/64* (2013.01); *H01R 13/582* (2013.01); *H01R 13/6592* (2013.01);
(Continued)

(58) Field of Classification Search
CPC .............. H01R 12/585; H01R 13/6592; H01R 13/5845; H01R 13/582; H01R 13/5825;
(Continued)

(56) References Cited

U.S. PATENT DOCUMENTS 5,989,071 A * 11/1999 Larsen ............... H01R 13/6467 439/418
6,648,674 B1 11/2003 Dobler
(Continued)

FOREIGN PATENT DOCUMENTS

CN 108598765 A 9/2018
DE 10146329 A1 4/2003
(Continued)

OTHER PUBLICATIONS

WO-2020133594-A1 with translation (Year: 2020).*
(Continued)

*Primary Examiner* — Marcus E Harcum
(74) *Attorney, Agent, or Firm* — Womble Bond Dickinson (US) LLP

(57) ABSTRACT

A plug connector device, in particular an RJ plug connector device, has a plug connector unit which is configured to create a plug connection extending along a plugging direction and which comprises a contact unit with at least two electric plug contacts, wherein the plug connector device includes a cable receiving unit comprising a wiring block for an accommodation of conductor cores of an electric cable and comprising a connection unit for creating a connection to at least one further element of the cable that is different from a conductor core, and that the plug connector device includes a wiring assistance unit, which is configured for a tool-less establishing of a connection between the wiring block and the contact unit.

17 Claims, 11 Drawing Sheets

Figure 1:
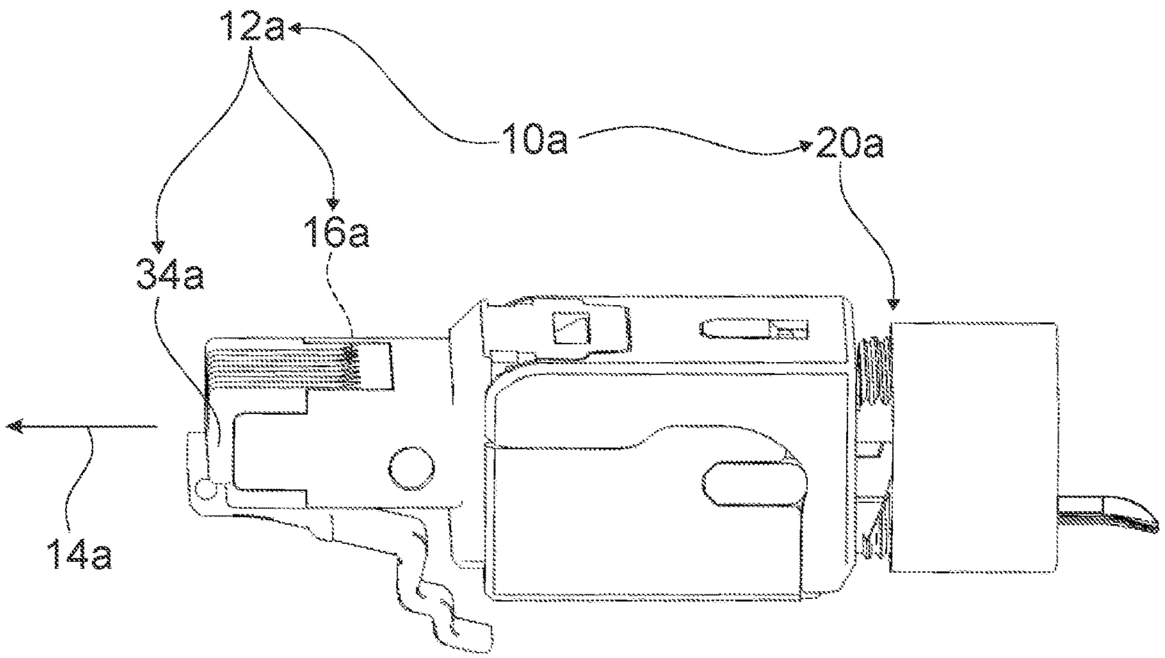

(51) Int. Cl.
*H01R 13/6592* (2011.01)
*H01R 4/2416* (2018.01)
*H01R 12/58* (2011.01)
*H01R 107/00* (2006.01)

(52) U.S. Cl.
CPC .......... *H01R 4/2416* (2013.01); *H01R 12/585* (2013.01); *H01R 2107/00* (2013.01)

(58) Field of Classification Search
CPC .. H01R 13/5829; H01R 24/64; H01R 4/2416; H01R 4/2433
USPC .................................... 439/607.43, 446, 467
See application file for complete search history.

(56) References Cited

U.S. PATENT DOCUMENTS

| | | | | |
|---|---|---|---|---|
| 7,306,487 | B1 * | 12/2007 | Chang | H01R 13/6593 439/98 |
| 7,578,695 | B2 * | 8/2009 | Boeck | H01R 13/585 439/463 |
| 7,713,081 | B2 * | 5/2010 | Chen | H01R 9/0527 439/468 |
| 7,871,285 | B1 * | 1/2011 | Tobey | H01R 4/2433 439/392 |
| 8,007,307 | B2 * | 8/2011 | Wang | H01R 13/506 439/367 |
| 8,262,406 | B2 * | 9/2012 | Lindkamp | H01R 13/5812 439/470 |
| 8,834,196 | B2 * | 9/2014 | Duran | H01R 13/6592 439/459 |
| 9,214,761 | B2 * | 12/2015 | Mueller | H01R 13/5829 |
| 9,985,359 | B2 * | 5/2018 | Jarzebiak | H01R 24/64 |
| 10,122,135 | B2 * | 11/2018 | Trio | H01R 13/5841 |
| 10,381,769 | B2 * | 8/2019 | Guitard | H01R 13/639 |
| 10,594,088 | B2 * | 3/2020 | Cupples | H01R 13/502 |
| 11,394,160 | B2 * | 7/2022 | Wang | H01R 13/5825 |
| 2008/0254682 | A1 | 10/2008 | Nickol et al. | |
| 2011/0028024 | A1 * | 2/2011 | Lu | H01R 13/6658 439/395 |
| 2013/0122737 | A1 * | 5/2013 | Fransen | H01R 13/648 439/389 |
| 2016/0336699 | A1 | 11/2016 | Trio et al. | |

FOREIGN PATENT DOCUMENTS

| | | | |
|---|---|---|---|
| DE | 202007005264 | U1 | 9/2008 |
| EP | 899827 | A2 | 3/1999 |
| EP | 3229325 | A1 | 10/2017 |

OTHER PUBLICATIONS

DE-202012100261-U1 with translation (Year: 2013).*
DE-102014110066-A1 with translation (Year: 2016).*
German Search Report on the Patentability of Application No. 10 2021 107 183.6, Mailed Oct. 8, 2021, 16 pages.

* cited by examiner

PLUG CONNECTOR DEVICE

CROSS-REFERENCE TO RELATED APPLICATIONS

This application claims priority from German Application No. 10 2021 107 183.6, filed on Mar. 23, 2021, the disclosure of which is incorporated herein by reference in its entirety.

BACKGROUND

The invention concerns a plug connector device according to the preamble of claim 1, a plug connector kit for producing a plug connector device according to claim 16 and a method for on-site assembly of an electric cable with a plug connector device according to claim 17.

From the state of the art, plug connectors are already known which include a plug connector unit comprising a contact unit with a plurality of plug contacts. In some known plug connectors a wiring block for an accommodation of conductor cores of a cable is inserted directly into a housing of the plug connector unit and is connected to the contact unit, a connection of a cable jacket to the housing unit for strain relief and/or a shield contacting of the cable shield being brought about only after a wiring by connecting the wiring block to the contact unit. Herein assembly is disadvantageously encumbered as individual conductor cores may slip from the wiring block while the strain relief and/or the shield contacting are/is established. Moreover, if the strain relief and/or the shield contacting are/is established subsequently, there may be changes in the transmission characteristics, which is a disadvantage. Other known plug connectors comprise a separate unit that includes the wiring block and is configured for a cable preparation realized by establishing a strain relief and/or a shield contacting before a wiring of the contact unit is brought about. However, a disadvantage of such a type of plug connectors is that special tools are required for the wiring, which also makes assembly difficult.

The objective of the invention is in particular to provide a generic device having improved characteristics in regard to assembly. The objective is achieved according to the invention by the features of claim 1 while advantageous implementations and further developments may be gathered from the subclaims.

ADVANTAGES OF THE INVENTION

The invention is based on a plug connector device, in particular an RJ plug connector device, with a plug connector unit which is configured to create a plug connection extending along a plugging direction and which comprises a contact unit with at least two electric plug contacts.

It is proposed that the plug connector device includes a cable receiving unit comprising a wiring block for an accommodation of conductor cores of an electric cable and comprising a connection unit for creating a connection to at least one further element of the cable, which is different from a conductor core, and that the plug connector device comprises a wiring assistance unit, which is configured for a tool-less establishing of a connection between the wiring block and the contact unit.

Such an implementation allows providing a plug connector device with particularly advantageous characteristics in regard to assembly. Advantageously, in assembly, due to the plug connector unit and the cable receiving unit being realized as separate units, firstly the complete cable preparation can be made at the cable receiving unit, which means that the conductor cores of the cable can be introduced into the wiring block, after that a shield contacting with the cable shield of the cable and a strain relief of the cable may be realized by creating the connection to the further element of the cable, e. g. the cable jacket, by means of the connection unit of the cable receiving unit. In this way, when this is followed by establishing the connection between the wiring block and the contact unit, it is advantageously possible to effectively prevent the difficulties often occurring with already known plug connector devices, for example individual conductor cores slipping from the wiring block, thus facilitating assembly. It is furthermore ensured that the transmission characteristics do not change when the connection between the wiring block and the contact unit is established, which allows providing a plug connector device having particularly advantageous transmission characteristics, for example a very low degree of cross-talk. The wiring-assistance unit moreover advantageously enables especially easy and tool-less establishing of the connection between the wiring block and the contact unit, thus simplifying assembly even further.

The plug connector device forms at least a portion, in particular a sub-assembly group, of a plug connector, in particular an RJ plug connector, preferably an RJ45 plug connector. The plug connector device may also comprise the entire plug connector. The plug connector may be realized as a plug socket. Preferably the plug connector is realized as a plug. Alternatively, the plug connector may also be realized as a plug connector different than an RJ plug connector, for example as a single pair ethernet plug connector or as a different plug connector that is deemed expedient by someone skilled in the art. The plug connector device is configured for assembly, in particular on-site assembly, of an electric cable, in particular a patch cable. The plug connector device may include a plug connector kit, which comprises at least the plug connector unit and at least the cable receiving unit.

The plug connector unit comprises at least the contact unit and may also comprise further units and/or elements, for example a housing in which the contact unit is arranged at least partially and/or a locking element for a locking and unlocking of the plug connection. The plug connector unit, in particular the housing, the locking element and/or further units and/or elements, with the exception of electrically conductive components, like for example the electric plug contacts of the contact unit, may be made at least partially of a synthetic material. Preferably the plug connector unit, in particular the housing and/or the locking element and/or further units and/or elements, with the exception of electrically conductive components, is made at least partially of a metallic pressure die-casting material, for example a zinc die cast.

The contact unit comprises at least two electric plug contacts. The contact unit may comprise precisely two electric plug contacts. Preferably the contact unit comprises at least four electric plug contacts. The contact unit may comprise at least six, in particular at least eight, electric plug contacts.

The electric cable comprises at least two conductor cores. The electric cable could, for example, be implemented as a single pair ethernet cable having precisely two conductor cores. Preferably the electric cable is implemented as a twisted-pair cable and has at least four, in particular at least six, preferably at least eight, conductor cores, wherein respectively two of the conductor cores are twisted to form a core pair.

Preferably the plugging direction runs parallel to a main extension direction of the plug connector unit. The "main extension direction" of an object is herein a direction to be understood that runs parallel to the longest edge of a smallest geometrical rectangular cuboid completely enclosing the object.

The cable receiving unit comprises at least the wiring block and the connection unit and may also comprise further units and/or elements. The wiring block is configured for an accommodation of the conductor cores of the cable and for a wiring of the contact unit with the conductor cores of the cable. In an assembled state, in particular in a state in which the connection between the wiring block and the contact unit has been brought about by means of the wiring assistance unit, the wiring block connects the conductor cores of the electric cable in an electrically conductive manner to the contact unit, connecting in particular respectively one conductor core of the electric cable to respectively one electric plug contact of the contact unit. The conductor cores of the cable may in the assembled state be connected non-releasably, for example soldered or crimped, with the contact unit by means of the wiring block. Preferably, the conductor cores of the cable are in the assembled state connected releasably with the contact unit by means of the wiring block. For example, conductor cores of the electric cable may in the assembled state be connected releasably with the contact unit by means of the wiring block via at least one insulation displacement contact (IDC), wherein the conductor cores are in each case pressed by the wiring block with their insulation individually into a so-called insulation-displacement connector of the contact unit in such a way that the insulation is severed and in each case an electrically conductive connection of the conductor cores to the electric plug contact of the contact unit is established. Alternatively the conductor cores of the electric cable could be respectively connected releasably with the contact unit by the wiring block via a so-called insulation piercing contact (IPC), wherein the insulation piercing contact has at least one spike which in the assembled state, in particular by the establishment of the connection between the wiring block and the contact unit, is pressed through the insulation of the conductor core in such a way that in each case an electrically conductive connection of the conductor cores to at least one electric plug contact of the contact unit is brought about.

The connection unit is configured to create the connection to at least one further element of the cable, which is different from a conductor core, and has for this purpose at least one connection element. The connection unit could be configured to create a permanent, in particular non-releasable, connection, for example a substance-to-substance bond, in particular an adhesive connection, to the further element of the cable. Preferably the connection unit is configured to create a releasable, in particular tool-lessly releasable, connection, in particular a form-fit and/or force-fit connection, to the further element of the cable. The connection element of the connection unit may be realized as a latch element. Preferably the connection element is realized as a clamping element and is configured to engage around the further element of the cable in a form-fit and/or force-fit manner. Preferably the connection unit has a further connection element, which is configured to cooperate with the connection element for creating the connection. The further connection element could, for example, comprise a nut which is configured, for the purpose of creating the connection, to be screwed with a corresponding thread on the connection element.

The further element may, for example, be a cable shield of the electric cable. Preferably the further element is a cable jacket of the electric cable.

The wiring assistance unit is configured at least for a tool-less establishing of the connection between the wiring block and the contact unit. Preferably the wiring assistance unit is moreover configured for a tool-less establishing of a connection between the higher-level units, in particular between the cable receiving unit and the plug connector unit. The wiring assistance unit may be configured to connect the cable receiving unit to the plug connector unit indirectly, namely via the connection between the wiring block and the contact unit. Preferably the wiring assistance unit is configured to connect the cable receiving unit and the plug connector unit to each other directly, namely via at least one further connection, which is different from the connection between the wiring block and the contact unit. Preferably the wiring assistance unit is also configured for a tool-less releasing of the connection between the wiring block and the contact unit.

In the present document numerals like, for example, "first" and "second" prefixed to certain terms only serve for distinguishing objects and/or for allocating objects to one another, without implying any existing total number and/or ranking of the objects. In particular, a "second object" does not necessarily imply the existence of a "first object".

"Configured" is to mean specifically designed and/or equipped. By an object being configured for a certain function is to be understood that the object fulfills and/or executes said certain function in at least one application state and/or operation state.

The plug connector unit may comprise a plug socket element for receiving a plug. However, in an advantageous implementation it is proposed that the plug connector unit comprises a plug element for an insertion into a plug socket. Such an implementation allows providing a plug connector device which is part of a plug connector that is embodied as a plug and which has the advantageous characteristics described above.

Beyond this it is proposed that the connection unit comprises a strain relief for a cable jacket of the cable. As a result, assembly is advantageously further improvable. It is in particular possible to prevent inadvertent releasing of the connection between the conductor cores of the cable and the electric plug contacts of the contact unit occurring due to tensile strain during an establishment of the connection between the wiring block and the contact unit. Preferably the strain relief is provided via at least one connection element of the connection unit, which is at the same time configured for creating the connection to the at least one further element of the electric cable that differs from the conductor core, in particular the cable jacket of the electric cable.

It is further proposed that the connection unit comprises a shield contact for contacting a cable shield of the cable. Such an implementation advantageously allows improving assembly even further. It is in particular possible to generate a shield contacting before the connection between the wiring block and the contact unit is brought about, thus advantageously ensuring that transmission characteristics will not change when the contact unit is wired. It would also be conceivable that besides the shield contacting to the cable shield, the shield contact is also configured for a strain relief.

The wiring assistance unit may be connected exclusively to the plug connector unit or could be implemented integrally with the plug connector unit. It would also be conceivable that the wiring assistance unit is connected exclusively to the cable receiving unit or is implemented integrally with the cable receiving unit. However, in an advantageous implementation it is proposed that the wiring assistance unit comprises a first sub-unit, which is part of the plug connector unit, and a second sub-unit, which cooperates with the first sub-unit and is part of the cable receiving unit. This advantageously allows further improving assembly. Moreover, advantageously a particularly simple replacement of the cable guiding unit by a further cable guiding unit also having a second sub-unit will be enabled.

Furthermore it is proposed that the first sub-unit comprises a flap, which is pivotable around a pivot axis extending perpendicularly to the plugging direction and is configured to provide a force acting in the plugging direction for establishing the connection between the wiring block and the contact unit. This advantageously allows improving assembly even further. In particular, tool-less establishing of the connection between the wiring block and the contact unit by simple technical means is enabled. The flap is configured to execute a rotational movement around the pivot axis, the rotational movement being at least partly converted into the force acting in the plugging direction by a cooperation with the second sub-unit.

It is also proposed that the flap has at least one first inner contour, which is configured to cooperate with a first outer contour of the second sub-unit. Such an implementation advantageously allows further improving assembly. The flap may have exactly one first inner contour. However, in an advantageous implementation it is proposed that the flap has at least one second inner contour, which is configured to cooperate with a second outer contour of the second sub-unit. This advantageously allows reducing planar pressure, thus enabling a particularly even force transmission for establishing the connection between the wiring block and the contact unit. Preferably the flap comprises two flap arms, which are oriented perpendicularly to the plugging direction when the connection between the wiring block and the contact unit has been established. Preferably the flap arms are realized mirror-symmetrically to each other and are arranged on two opposite-situated sides of the flap. Preferably the first inner contour and/or the second inner contour are/is respectively arranged on a first one of the flap arms. Preferably the flap has a further first inner contour, which is configured to cooperate with a further first outer contour of the second sub-unit, and has a further second inner contour, which is configured to cooperate with a further second outer contour of the second sub-unit, the first and second inner contours being respectively arranged on a second one of the flap arms. Preferably, in a view of the flap perpendicularly to the plugging direction, the first inner contour has the shape of a curve which extends, starting with a first region having a course that is substantially parallel to the plugging direction, into a second region having a course that is substantially perpendicular to the plugging direction.

It is further proposed that the first inner contour and the second inner contour are arranged offset from each other in the plugging direction. Such an implementation advantageously allows further improving assembly. In particular, especially even force introduction and force transmission are achievable. Advantageously, it is moreover possible to achieve saving of space, thus providing a particularly compact plug connector device, which may in particular be advantageous in cramped regions, for example in server rooms comprising a plurality of plug connectors that are to be placed in a close-packed manner, as this will also allow increasing plugging density. In addition, it is proposed that the first inner contour is configured to lock the connection between the wiring block and the contact unit. This advantageously allows improving an operator's comfort as inadvertent releasing of the wiring against the plugging direction can be prevented. It is furthermore advantageously possible to provide a particularly compact plug connector device as additional elements for a locking may be done without.

Beyond this it is proposed that the second sub-unit comprises at least one first guiding cam and at least one second guiding cam, which is arranged offset from the first guiding cam in a circumferential direction, the guiding cams being configured to engage in corresponding guiding grooves of the plug connector unit. This advantageously allows further improving assembly. It is in particular possible to prevent jamming during assembly. Moreover, particularly targeted force transmission is advantageously achievable when establishing the connection between the wiring block and the contact unit, such that it is further advantageously possible to obtain a particularly even wiring of all insulation displacement contacts.

It is furthermore proposed that a width extension of the first guiding cam, which extends perpendicularly to the plugging direction, differs from a width extension of the second guiding cam, which extends perpendicularly to the plugging direction. Such an implementation advantageously allows further improving assembly. It is in particular possible to prevent an erroneous assembly, according to the poka-yoke principle, with particularly simple technical means.

In an alternative advantageous implementation it is proposed that the first sub-unit comprises at least one first guiding cam and at least one second guiding cam which is arranged offset from the first guiding cam in a circumferential direction, the guiding cams being configured to engage into corresponding guiding grooves of the second sub-unit. Such an implementation advantageously enables improved assembly. It is in particular possible to prevent jamming during assembly. Moreover, particularly targeted force transmission is advantageously achievable when establishing the connection between the wiring block and the contact unit, such that it is further advantageously possible to obtain a particularly even wiring of all insulation displacement contacts.

Beyond this it is proposed that the guiding cams are arranged off-center with respect to a height extent of the first sub-unit. This advantageously allows further improving assembly. It is in particular possible to achieve an anti-twist protection by simple technical means, thus preventing an erroneous assembly by the poka-yoke principle.

In a further aspect of the invention, which may in particular be considered by its own as well as in a combination with the further aspects of the invention, it is proposed that the contact unit comprises at least four electric plug contacts, a circuit board that is in an assembled state aligned perpendicularly to the plugging direction, and at least four connection lines between the circuit board and the plug contacts, wherein in a view along the plugging direction, connection paths between respectively two of the connection lines are at least substantially perpendicular to each other. Such an implementation advantageously allows improving transmission technique. It is in particular possible to reduce, preferably to minimize, cross-talk between conductor pairs implemented by respectively two of the connection lines. The connection paths are herein to be understood as imaginary lines running parallel to a main extension plane of the circuit board and in each case through the center points of two of the connection lines which together form a conductor pair. By a "main extension plane" is herein a plane to be understood which is parallel to a largest side surface of a smallest imaginary rectangular cuboid that just still completely encloses the structural unit, and which in particular extends through the center point of the rectangular cuboid. In this document, "at least substantially perpendicular(ly)" is to mean a deviation from a right angle by less than 20°, in particular by less than 15°, advantageously by less than 10°, especially advantageously by less than 7.5°, preferably by less than 5° and particularly preferentially by less than 2.5°. The contact unit may comprise at least two, in particular four, further electric contacts, which are respectively connected to the circuit board via further connection lines. It is conceivable that in a view along the plugging direction, further connection paths between respectively two of the connection lines are at least substantially perpendicular to each other. Preferably the further connection lines are arranged on the circuit board, in at least one direction that is perpendicular to the plugging direction, spaced apart from the at least four connection lines. Preferentially two of the further connection lines that form a further first conductor pair are arranged, in a first direction that is perpendicular to the plugging direction, at a distance to the four connection lines, and two of the further connection lines that form a further second conductor pair are arranged on the circuit board in a second direction, which is opposed to the first direction.

In a further aspect of the invention, which may in particular be considered by its own as well as in a combination with the further aspects of the invention, it is proposed that the contact unit comprises at least four electric plug contacts, a circuit board which is in an assembled state oriented perpendicularly to the plugging direction, and at least one further circuit board, which is in the assembled state oriented parallel to the plugging direction. By such an implementation a transmission technique is advantageously improvable. In particular, cross talk between conductor pairs is reducible, preferably minimizable, if the contact unit comprises a circuit board which is in an assembled state oriented perpendicularly to the plugging direction and at least one further circuit board which is in the assembled state oriented parallel to the plugging direction.

Furthermore, it is proposed that the contact unit comprises at least one EON plug contact, which is in the assembled state pressed into the circuit board. As a result, assembly is advantageously further improvable. In particular, when establishing a connection between the plug contact and the circuit board, soldering may advantageously be dispensed with if the plug contact is embodied as an EON plug contact. In a comparison to soldered connections, this further advantageously allows avoiding a thermal load when establishing the connection between the plug contact and the circuit board. By an "EON plug contact" is a certain type of electric plug contact to be understood which is in the expert language also referred to as a press-fit pin or, in English, as an "Eye-of-the-Needle press-fit connector (EON)". The EON plug contact comprises a press-fit zone having an elongate hollow space whose shape is in particular similar to a pinhead shape and which is mechanically deformed while being pressed into the circuit board. Thus a high reliability of the connection is advantageously also achievable as during pressing-in of the press-fit zone into a metallized pass-through opening in the circuit board, a deformation of the EON plug contact is realized in the region of the press-fit zone, such that a reliable establishment of the connection can be ensured even in case of fluctuating diameters of the metallized pass-through opening. This further advantageously result in an increased manufacturing tolerance. Further advantageously, due to a high degree of elasticity of the EON plug contact there will be a very small mechanical load of the circuit board during pressing-in. The contact unit may comprise several EON plug contacts, which are pressed into the circuit board in a mutually offset manner. For example, the contact unit may comprise at least two, in particular at least four, preferably at least six and particularly preferentially at least eight EON plug contacts, which are pressed into the circuit board in a mutually offset manner. Preferably the insulation displacement contacts of the contact unit are also realized as EON plug contacts.

In a further aspect of the invention, which may in particular be considered by its own as well as in a combination with the further aspects of the invention, it is proposed that the plug connector device includes a cable receiving unit comprising a wiring block for an accommodation of conductor cores of an electric cable and comprising a connection unit for creating a connection to at least one further element of the cable that is different from a conductor core, wherein the cable receiving unit comprises a guiding unit for a guidance of the conductor cores from the connection unit into the wiring block, the guiding unit connecting the connection unit with the wiring block in an angled fashion. Such an implementation advantageously allows improving assembly. In particular, an angled orientation of the electric cable relative to the plugging direction is enabled, thus facilitating—in particular in cramped spaces with a plurality of plug connectors arranged side by side—an establishing of the plug connections. Preferably the guiding unit connects the connection unit with the wiring block in an angled fashion, at an at least substantially right angle, while in particular angles greater or smaller than 90° are also conceivable. Preferably the guiding unit connects the connection unit with the wiring block in an angled fashion in such a way that in an assembled state of the plug connector device, the wiring block is oriented in the plugging direction and the connection unit is oriented at an angle to the plugging direction.

It is further proposed that a contact region of the guiding unit for contacting the wiring block is rotationally symmetrical with respect to the plugging direction. Such an implementation advantageously allows further improving assembly. Preferably the contact region is supported rotatably relative to a further region of the guiding unit, which is connected to the connection unit, and it can be fixed in its orientation relative to the connection unit in at least two, in particular at least three, preferably at least four stages. For this purpose the guiding unit preferably comprises a swivel joint, which connects the contact region to the further region. In this way assembly is even further improvable as an orientation of the electric cable is enabled in different directions in an angled fashion, in particular at least substantially perpendicularly to the plugging direction. The guiding unit preferably comprises a slotted link for force transmission. The slotted link for force transmission is preferably arranged at the further region. Preferably the slotted link for force transmission comprises at least two outer contour elements, which are oriented counter to the plugging direction. Preferentially a number of outer contour elements of the slotted link for force transmission corresponds to a number of stages in which the contact region can be fixed relative to the further region. Preferably each outer contour element has at least one outer contour, whose shape corresponds at least substantially to a shape of the second outer contour of the second sub-unit of the wiring assistance unit.

Beyond this it is proposed that the connection unit comprises a connection flap, which is pivotable around a pivot axis extending perpendicularly to the plugging direction for the purpose of assisting accessibility to a portion of the connection unit. This advantageously allows further improving assembly. It is moreover proposed that the portion of the connection unit comprises a shield contact, which is pivotable around a further pivot axis extending perpendicularly to the plugging direction for the purpose of assisting with a shield contacting. This advantageously allows further improving assembly. In particular, shield contacting is facilitated. The shield contact is preferably pivotable into at least two positions, wherein the shield contact is in a first position oriented in the direction of the plugging direction and is in a second position oriented at an angle to the plugging direction. Preferably, in the second position an angle between the shield contact and the plugging direction is at least substantially equivalent to an angle at which the guiding unit connects the wiring block to the connection unit.

In a further advantageous implementation it is proposed that the guiding unit is realized in a multi-part fashion and comprises a guiding base body, which is oriented parallel to the plugging direction, as well as at least two deflection elements for an angled connection of the connection unit to the wiring block. Such an implementation advantageously allows further improving assembly. It is moreover advantageously possible to improve flexibility, in particular as a flexible adaption of the connection unit to a desired spatial orientation between the cable and the plugging direction is particularly easily possible.

It is also proposed that the deflection elements are realized as corresponding halfshells and are configured for establishing a form-fit connection to the guiding base body. This advantageously allows further improving assembly. Advantageously a toolless and particularly simple establishment of an angled connection of the connection unit to the wiring block is enabled.

Furthermore it is proposed that the plug connector device comprises a shield contact, which is rotatably connected to the guiding base body and is latchable in at least four positions. Such an implementation advantageously allows further improving flexibility, in particular as a flexible adaption of the shield contacting to a desired spatial orientation between the cable and the plugging direction is particularly easily possible. Preferably the shield contact is rotatable with the guiding base body by an angle of 360°. Preferably the shield contact is releasably connected to the guiding base body. The guiding base body advantageously has at least four latching grooves, which are arranged offset along its circumferential direction, wherein the shield contact is configured to latch into one of the latching grooves depending on a desired orientation. The shield contact is preferably pivotable around a pivot axis that extends perpendicularly to the plugging direction, and is in particular pivotable between an orientation parallel to the plugging direction and an orientation perpendicular to the plugging direction.

In a further aspect of the invention, which may in particular be considered by its own as well as in a combination with the further aspects of the invention, it is proposed that the plug connector device includes a cable receiving unit comprising a wiring block for an accommodation of conductor cores of an electric cable, and comprising a connection unit for creating a connection to at least one further element of the cable that is different from a conduction core, wherein the connection unit comprises at least one connection element with a plurality of lamellae, which are configured to engage around the further element of the cable along a circumferential direction and which are oriented counter to the plugging direction and configured for an optical indication. Such an implementation advantageously allows providing a plug connector device having advantageous characteristics regarding assembly. As the lamellae are oriented counter to the plugging direction, an optical indication concerning a state of the connection to the at least one element that differs from a conductor core is achievable with particularly simple technical means. It is advantageously possible to easily prevent damaging of the connection element, for example due to over-tightening when creating the connection. Preferably the connection element is implemented as an elastic element, which is repeatedly deformable without being mechanically damaged or destroyed, and which following a deformation autonomously seeks to reassume its original shape.

In a further aspect of the invention, which may in particular be considered by its own as well as in a combination with the other aspects of the invention, it is proposed that the plug connector device includes a cable receiving unit comprising a wiring block for an accommodation of conductor cores of an electric cable and a connection unit for creating a connection to at least one further element of the cable which is different from a conductor core, wherein the connection unit comprises at least one sleeve-like connection element, which is configured to engage around the further element of the cable along a circumferential direction and to generate a resistance against a tensile load of the cable counter to the plugging direction. Such an implementation advantageously allows improving user-friendliness. It is in particular possible to counteract an undesired releasing of the conductor cores out of the wiring block in case of a tensile load of the cable counter to the plugging direction. Preferably the sleeve-like connection element is embodied as a squeeze element. Preferably the connection unit comprises a connection element and a further connection element, which act together for creating the connection to at least one further element of the cable that is different from a conductor core. For example, the connection element may comprise a thread and the further connection element may comprise a nut that is configured to be screwed with the thread of the connection element for the purpose of creating the connection. When the connection between the further element of the cable and the further connection element is created, the sleeve-like connection element is arranged between the further element of the cable and the further connection element and, when the further connection element is connected to the connection element, the sleeve-like connection element is pressed into the further element of the cable, for example the cable jacket of the cable, such that a considerable resistance against a pulling-out of the cable out of the cable receiving unit is generated. Preferably the sleeve-like connection element is realized as an elastic element, which is repeatedly deformable without being mechanically damaged or destroyed, and which following a deformation autonomously seeks to reassume its original shape. Preferably the sleeve-like connection element comprises several recesses which are arranged offset to each other along its circumferential direction, thus advantageously allowing even further increasing a resistance against a pulling-out of the cable out of the cable receiving unit.

The invention further concerns a plug connector kit for producing a plug connector device according to one of the above-described implementations with the plug connector unit and with the cable receiving unit. Such a plug connector kit is in particular distinguished by its advantageous characteristics regarding an assembly for producing the plug connector device. The plug connector kit may advantageously comprise the plug connector unit and at least two cable receiving units, which may be realized at least partially differently from each other, in particular according to respective aspects and/or combinations of the above-described implementations of the plug connector device. As a result, a particularly high degree of flexibility is achievable. It is also conceivable that the plug connector kit comprises at least two different plug connector units differing from each other, for example, regarding a number of electric plug contacts of the contact unit. As a result, a particularly high degree of flexibility is achievable. The plug connector kit may also comprise at least one electric cable.

Furthermore a method is proposed for a field assembly of an electric cable with a plug connector device according to one of the previously described implementations, wherein at least one conductor core of the electric cable is connected to at least one electric plug contact of the contact unit. Such a method advantageously allows obtaining particularly simple, quick and secure field assembly by which furthermore, in particular in commercial applications with a plurality of cables that are to be assembled, time-saving and thus cost-saving are advantageously achievable.

The plug connector device according to the invention as well as the plug connector kit shall here not be limited to the applications and implementations described above. In particular, for the purpose of fulfilling a functionality that is described here, the plug connector device according to the invention and/or the plug connector kit may comprise a number of individual elements, components and units that differs from a number that is given here.

DRAWINGS

Further advantages will become apparent from the following description of the drawings. In the drawings four exemplary embodiments of the invention are illustrated. The drawings, the description and the claims contain a plurality of features in combination. Someone skilled in the art will purposefully also consider the features separately and will find further expedient combinations.

Figure 4:
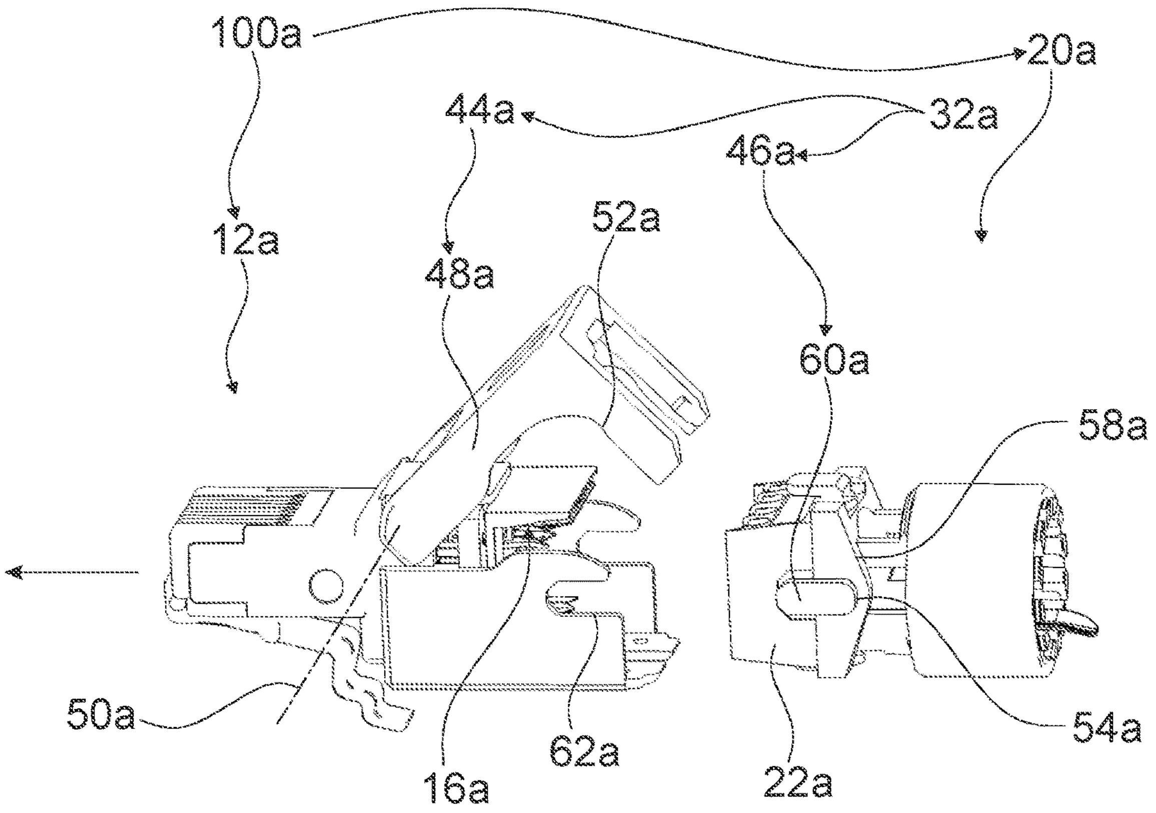
Figure 8:
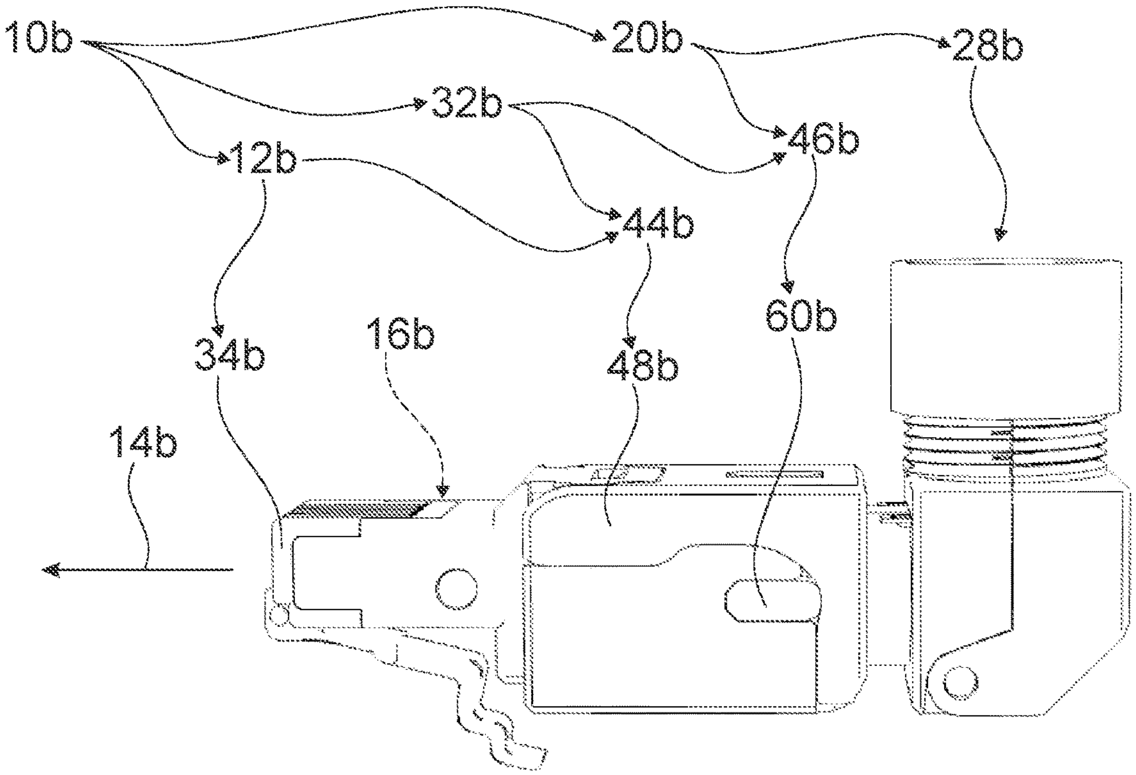
Figure 10:
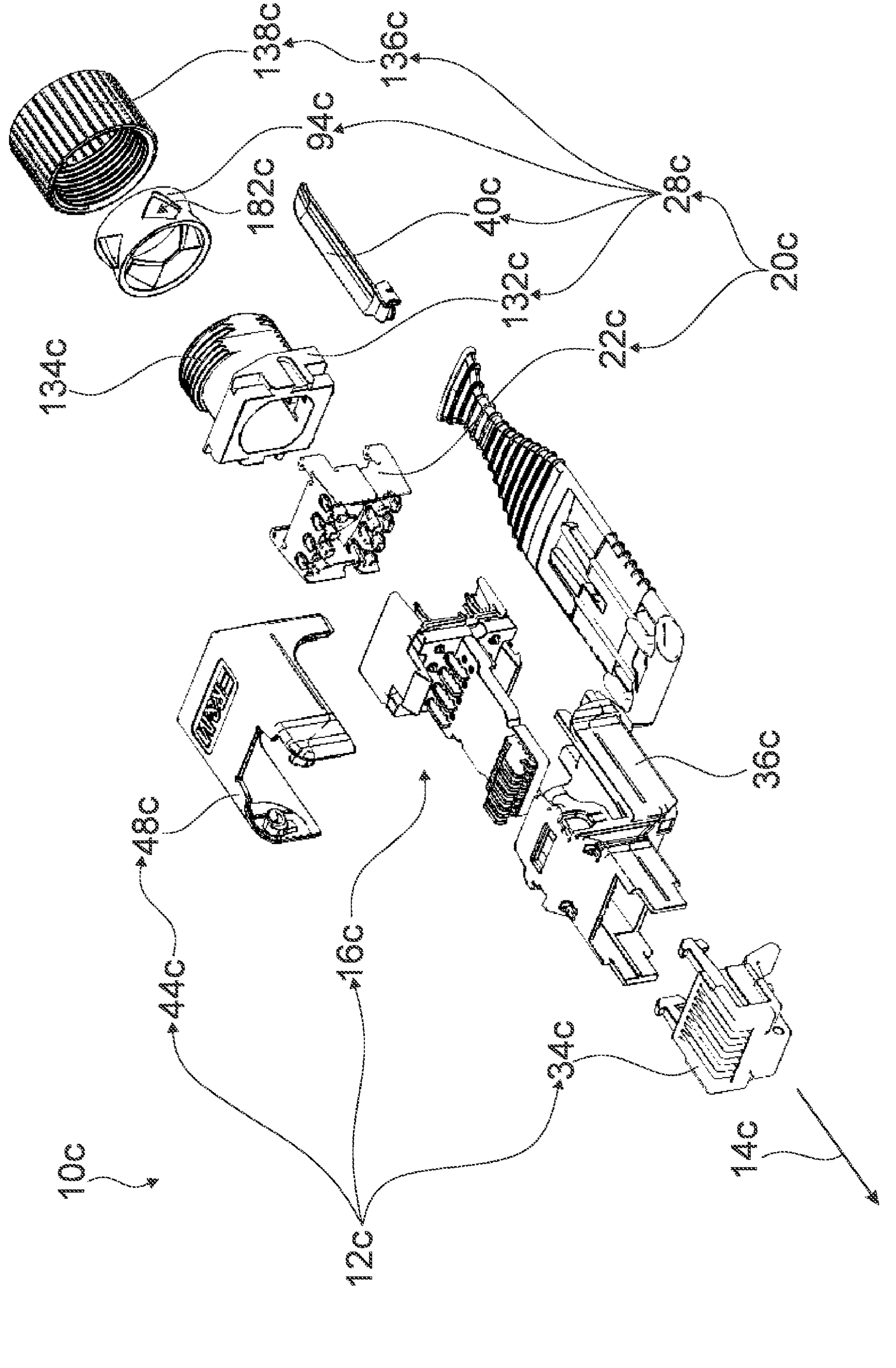
Figure 11:
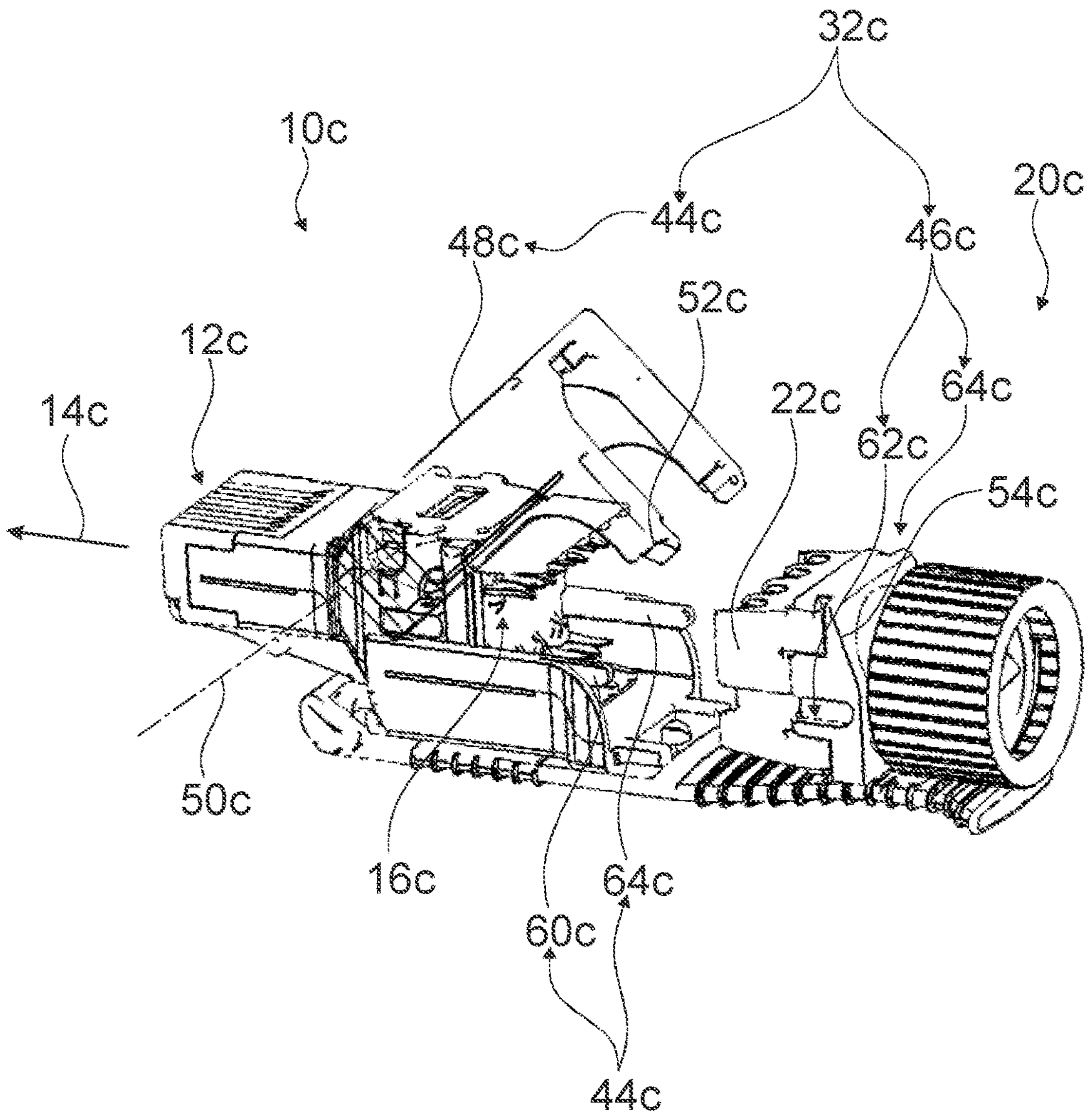
Figure 13:
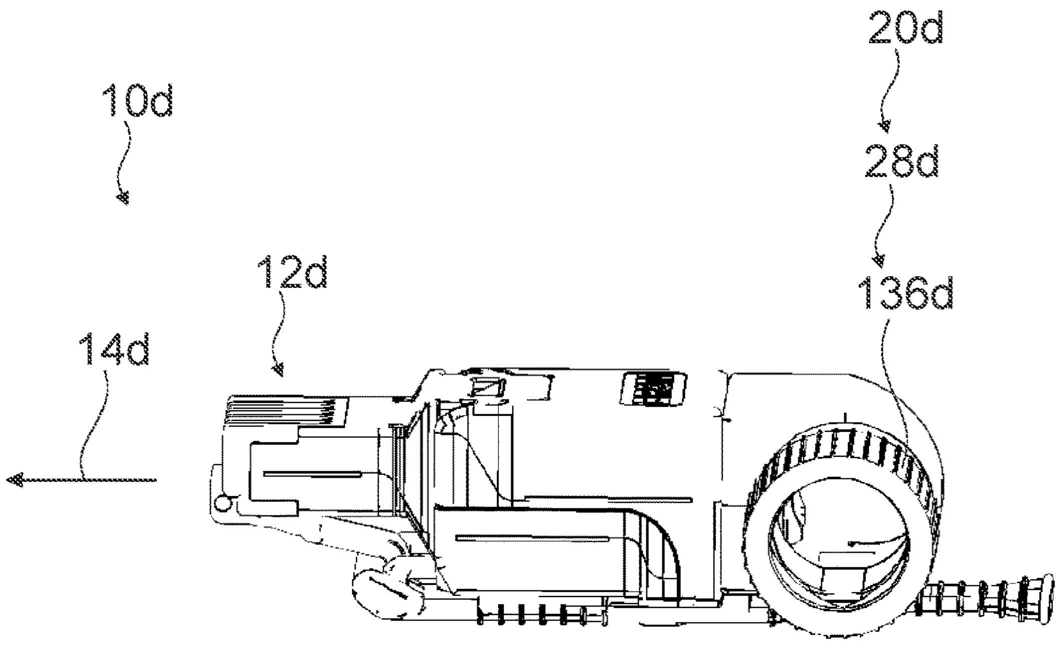

It is shown in:

- a plug connector device with a plug connector unit and a cable receiving unit, in a schematic perspective view,
- an electric cable in a schematic sectional view,
- the plug connector device in a schematic exploded view,
- a plug connector kit for producing the plug connector device with the plug connector unit and the cable receiving unit, in a schematic perspective view,
- a further schematic perspective view of the plug connector kit of FIG. 4,
- a contact unit of the plug connector unit with a circuit board and with a plurality of electric plug contacts, in two schematic views,
- a schematic flow chart of a method for a field assembly of the electric cable with the plug connector unit,
- a further exemplary embodiment of a plug connector device with a plug connector unit and a cable receiving unit, in a schematic perspective view,
- the cable receiving unit of the plug connector device of FIG. 8, in a schematic perspective view,
- a further exemplary embodiment of a plug connector device with a plug connector unit and a cable receiving unit, in a schematic exploded view,
- the plug connector unit of FIG. 10 in a schematic perspective view,
- a contact unit of the plug connector unit of the exemplary embodiment of FIGS. 10 and 11 with a circuit board, a plurality of electric plug contacts and a further circuit board, in three schematic views,
- a further exemplary embodiment of a plug connector device with a plug connector unit and a cable receiving unit, in a schematic view, and
- the cable receiving unit of the plug connector device of the exemplary embodiment of FIG. 13, in a schematic exploded view.

DESCRIPTION OF THE EXEMPLARY EMBODIMENTS

FIG. 1 illustrates a plug connector device 10*a* in a schematic perspective view. The plug connector device 10*a* is configured to create a plug connection that extends along a plugging direction 14*a*.

The plug connector device 10*a* comprises a plug connector unit 12*a*. The plug connector unit 12*a* comprises a contact unit 16*a*. The contact unit 16*a* comprises at least two electric plug contacts 18*a*, 102*a* (see FIG. 6).

The plug connector unit 12*a* comprises a plug element 34*a* for an insertion into a plug socket (not shown).

Figure 2:
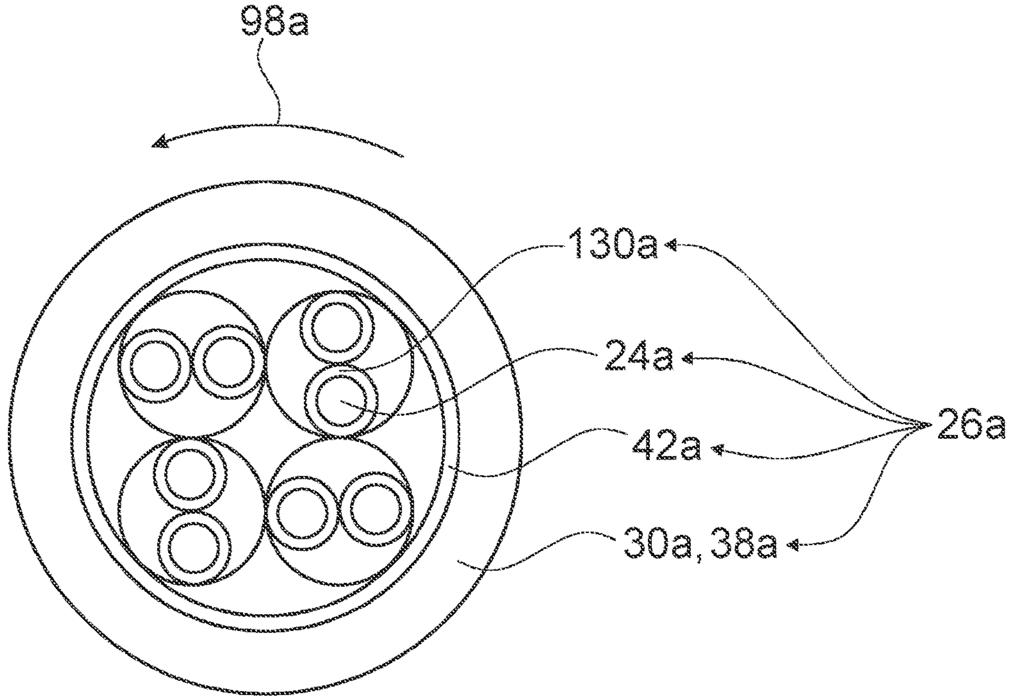

The plug connector device 10*a* comprises a cable receiving unit 20*a* for receiving an electric cable 26*a* (see FIG. 2).

If there are a plurality of objects, only one of these objects is given a reference numeral in the figures.

FIG. 2 shows a schematic sectional view of the electric cable 26*a*. The electric cable 26*a* is embodied as a twisted-pair cable and is configured for a data transmission. The electric cable 26*a* comprises a plurality of conductor cores 24*a*. In the present case the electric cable 26*a* comprises eight conductor cores 24*a* in total. Each of the conductor cores 24*a* is encompassed by a core sheath 130*a*. Respectively two of the conductor cores 24*a* are twisted to form a core pair of the electric cable 26*a*. The electric cable 26*a* comprises a cable shield 42*a*. The cable shield 42*a* encompasses the conductor cores 24*a* along a circumferential direction 98*a*. The electric cable 26*a* comprises a cable jacket 38*a*. The cable jacket 38*a* encompasses the cable shield 42*a* along the circumferential direction 98*a*.

Figure 3:
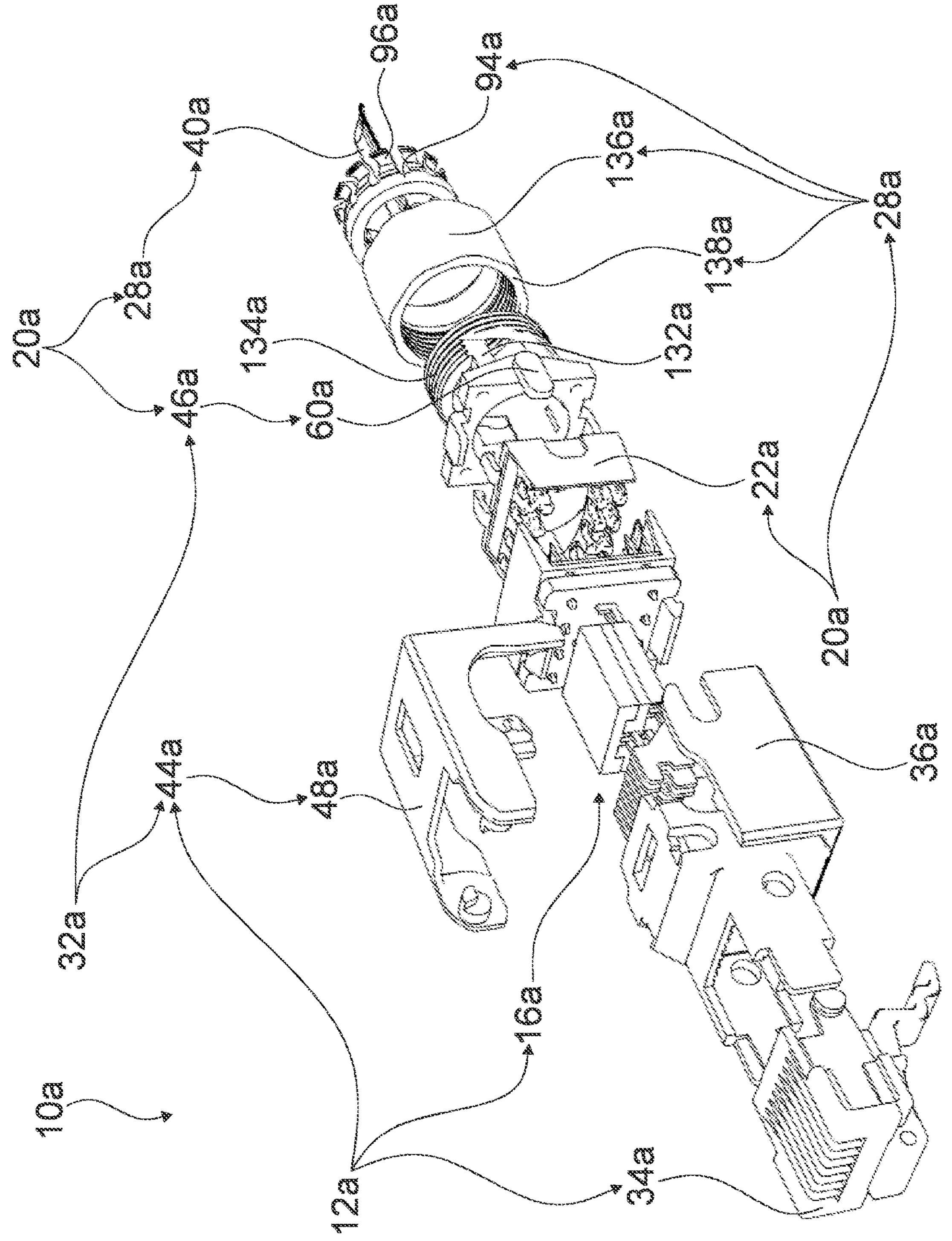

FIG. 3 shows the plug connector device 10*a* in a schematic exploded view. The plug connector unit 12*a* comprises a housing 36*a*. The housing 36*a* is made of a metallic die-cast material and is configured to accommodate the contact unit 16*a* and the plug element 34*a*.

The cable receiving unit 20*a* comprises a wiring block 22*a* for receiving conductor cores 24*a* of the electric cable 26*a* (see FIG. 2). The cable receiving unit 20*a* comprises a connection unit 28*s* for establishing a connection to at least one further element 30*a* of the cable 26*a*. The wiring block 22*a* is releasably connected to the connection unit 28*a*, namely via a plug connection. In the present case the further element 30*a* is the cable jacket 38*a* of the electric cable 26*a* (see FIG. 2).

The connection unit 28*a* comprises a connection base body 132*a*. The connection base body 132*a* has a thread 134*a*. The connection unit 28*a* comprises at least one connection element 94*a*. The connection element 94*a* comprises a plurality of lamellae 96*a*. The lamellae 96*a* are configured to engage around the further element 30*a*, in the present case the cable jacket 38*a*, of the electric cable 26*a* along the circumferential direction 98*a* (see FIG. 2). When the connection to the further element 30*a* of the electric cable 26*a* has been created by the connection unit 28*a*, the lamellae 96*a* of the connection element 94*a* are oriented counter to the plugging direction 14*a*. The lamellae 96*a* are configured for an optical indication. The connection unit 28*a* includes a further connection element 136*a*, which comprises a nut 138*a* corresponding to the thread 134*a*. In order to create the connection to the further element 30*a* of the electric cable 26*a*, the connection element 94*a* is slid onto the electric cable 26*a* together with the further connection element 136*a* in such a way that the lamellae 96*a* are oriented counter to the plugging direction 14*a*. Then the nut 138*a* is screwed onto the thread 134*a*, wherein the lamellae 96*a* are pressed toward the cable jacket 38*a* and the connection is created. As the lamellae 96*a* are oriented counter to the plugging direction 14*a*, an optical indication of the strength of the connection is given.

The connection unit 28*a* comprises a strain relief for the cable jacket 38*a* (see FIG. 2) of the electric cable 26*a*. The strain relief is brought about via the connection unit 28*a* by means of the connection element 94*a* and the further connection element 136*a*.

The connection unit 28*a* comprises a shield contact 40*a* for a contacting of the cable shield 42*a* (see FIG. 2) of the electric cable 26*a*. For a shield contacting, the shield contact 40*a* is connected to the cable shield 42*a*. By the connection brought about by the connection element 94*a* and the further connection element 136*a*, the shield contacting is additionally safeguarded from getting released counter to the plugging direction 14*a*.

The plug connector device 10*a* comprises a wiring assistance unit 32*a*. The wiring assistance unit 32*a* is configured for tool-lessly establishing a connection between the wiring block 22*a* and the contact unit 16*a*.

Figure 5:
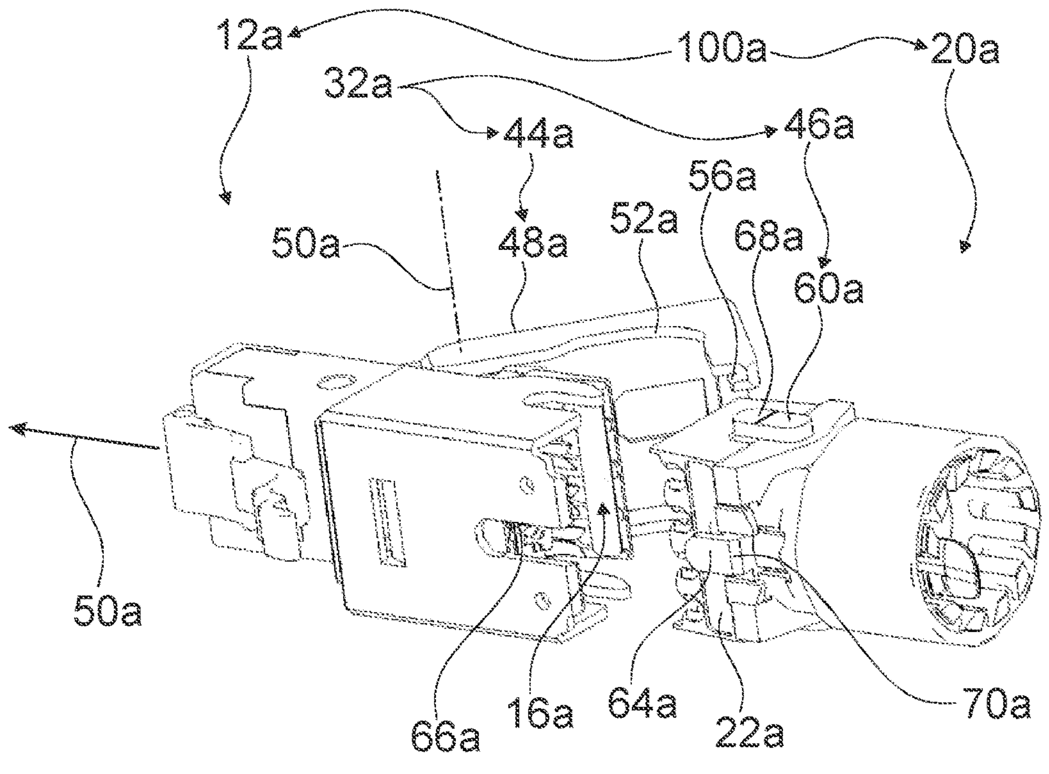

In FIGS. 4 and 5 a plug connector kit 100*a* for creating the plug connector device 10*a* is illustrated in two different perspective schematic views. The plug connector kit 100*a* comprises the plug connector unit 12*a* and the cable receiving unit 20*a*. The plug connector device 10*a* can be assembled from the plug connector kit 100*a*, wherein an especially simple and intuitive assembly is brought about due to the features of the wiring assistance unit 32*a*, which will be described below.

The wiring assistance unit 32*a* comprises a first sub-unit 44*a*. The first sub-unit 44*a* is part of the plug connector unit 12*a*. The wiring assistance unit 32*a* comprises a second sub-unit 46*a* which cooperates with the first sub-unit 44*a*. The second sub-unit 46*a* is part of the cable receiving unit 20*a*.

The first sub-unit 44*a* comprises a flap 48*a*. The flap 48*a* is pivotable around a pivot axis 50*a* that extends perpendicularly to the plugging direction 14*a*. The flap 48*a* is configured to provide a force that acts in the plugging direction 14*a* for establishing the connection between the wiring block 22*a* and the contact unit 16*a*. The flap 48*a* has at least one first inner contour 52*a*. The first inner contour 52*a* is configured to cooperate with a first outer contour 54*a* of the second sub-unit 46*a*. The flap 48*a* has a second inner contour 56*a*. The second inner contour 56*a* is configure to cooperate with a second outer contour 58*a* of the second sub-unit 46*a*. The first inner contour 52*a* and the second inner contour 58*a* are arranged offset from each other in the plugging direction 14*a*. Accordingly the first outer contour 54*a* and the second outer contour 58*a* are also arranged offset from each other in the plugging direction 14*a*.

The first inner contour 52*a* is configured for locking the connection between the wiring block 22*a* and the contact unit 16*a*. When the connection has been established, the inner contour 52*a* locks the wiring block 22*a* with the contact unit 16*a* counter to the plugging direction 14*a*.

The second sub-unit 46*a* comprises at least one first guiding cam 60*a*. The first outer contour 54*a* is formed by the guiding cam 60*a*. The second sub-unit 46*a* comprises at least one second guiding cam 64*a*. The second guiding cam 64*a* is arranged offset from the first guiding cam 60*a* in a circumferential direction 98*a*. The guiding cams 60*a*, 64*a* are configured to engage in corresponding guiding grooves 62*a*, 66*a* of the plug connector unit 12*a*. A first guiding groove 62*a* of the plug connector unit 12*a* corresponds to the first guiding cam 60*a* of the second sub-unit 46*a*. A second guiding groove 66*a* of the plug connector unit 12*a* corresponds to the second guiding cam 64*a* of the second sub-unit 46*a*. In the tool-less establishing of the connection between the wiring block 22*a* and the contact unit 16*a*, the guiding cams 60*a*, 64*a* engage in the respectively corresponding guiding grooves 62*a*, 66*a* of the plug connector unit 12*a* and are slid into the guiding grooves 62*a*, 66*a* in the plugging direction 14*a* by the force provided via the flap 48*a*.

A width extension 68*a* of the first guiding cam 60*a*, which extends perpendicularly to the plugging direction 14*a*, differs from a width extension 70*a* of the second guiding cam 64*a*, which extends perpendicularly to the plugging direction 14*a*. In the present case the width extension 70*a* of the second guiding cam 64*a* is greater than the width extension 68*a* of the first guiding cam 60*a*. The difference between the width extension 68*a* and the width extension 70*a* permits preventing an erroneous assembly when the connection between the wiring block 22*a* and the contact unit 16*a* is established.

Figure 6B:
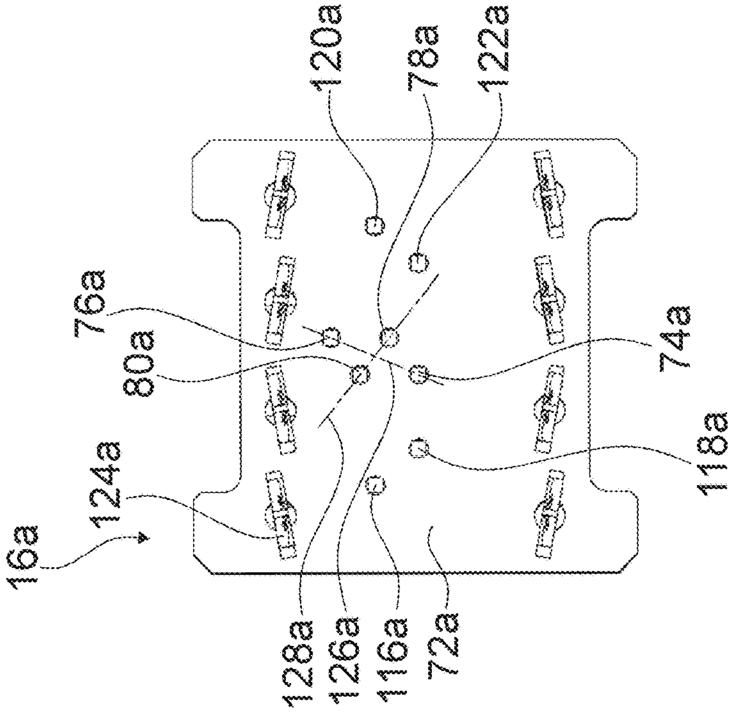
Figure 6A:
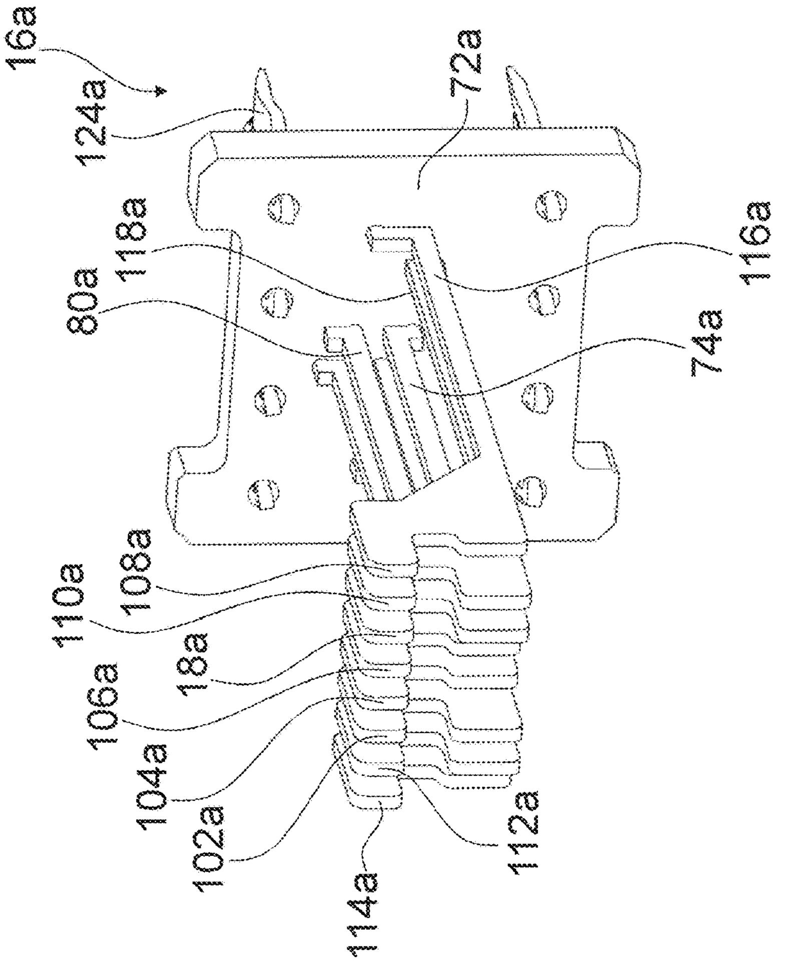

FIG. 6 shows the contact unit 16*a* of the plug connector device 10*a* in two schematic illustrations. In a lefthand illustration the contact unit 16*a* is depicted in a schematic perspective manner. The contact unit 16*a* comprises at least four electric plug contacts 18*a*, 102*a*, 104*a*, 106*a*. The contact unit 16*a* comprises a circuit board 72*a*. In an assembled state of the contact unit 16*a* within the plug connector unit 12*a*, the circuit board 72*a* is oriented perpendicularly to the plugging direction 14*a*. The contact unit 16*a* comprises at least four connection lines 74*a*, 76*a*, 78*a*, 80*a* between the circuit board 72*a* and the electric plug contacts 18*a*, 102*a*, 104*a*, 106*a*, wherein in the assembled state each of the connection lines 74*a*, 76*a*, 78*a*, 80*a* connects respectively one of the electric plug contacts 18*a*, 102*a*, 104*a*, 106*a* to the circuit board 72*a* in an electrically conductive manner.

In the present case the contact unit comprises eight electric plug contacts in total, namely the four electric plug contacts 18*a*, 102*a*, 104*a*, 106*a* and four further electric plug contacts 108*a*, 110*a*, 112*a*, 114*a*. The further electric plug contacts 108*a*, 110*a*, 112*a*, 114*a* are in each case electrically conductively connected to the circuit board 72*a* via further connection lines 116*a*, 118*a*, 120*a*, 122*a* of the contact unit 16*a*.

The contact unit 16*a* comprises a plurality of insulation displacement contacts 124*a*, which are connected to the circuit board 72*a*. In the present case the contact unit 16*a* comprises eight insulation displacement contacts 124*a* in total. In the assembled state the insulation displacement contacts 124*a* are oriented counter to the plugging direction 14*a*. When the connection between the wiring block 22*a* and the contact unit 16*a* is established via the wiring assistance unit 32*a*, an electrically conductive connection is created between the conductor cores 24*a* of the electric cable 26*a* and the electric plug contacts 18*a*, 102*a*, 104*a*, 106*a*, respectively the further electric plug contacts 108*a*, 110*a*, 112*a*, 114*a* via the insulation displacement contacts 124*a*.

A righthand-side schematic illustration of FIG. 6 shows the circuit board 72*a* in a lateral view in a view direction along the plugging direction 14*a*. In a view along the plugging direction 14*a*, connection paths 126*a*, 128*a* between respectively two of the connection lines 74*a*, 76*a*, 78*a*, 80*a* are at least substantially perpendicular to each other. In the present case a first connection path 126*a*, which extends respectively diagonally through the connection points in which the connection line 74*a* and the connection line 76*a* are connected to the circuit board 72*a*, is at least substantially perpendicular to a second connection path 128*a*, which extends respectively diagonally through the connection points in which the connection line 78*a* and the connection line 80*a* are connected to the circuit board 72*a*. In an operating state of the plug connector device 10*a*, the electric plug contact 18*a* and the electric plug contact 102*a*, which are connected to the circuit board 72*a* via the connection line 74*a* and the connection line 76*a*, form a first conductor pair. In the operating state of the plug connector device 10*a*, the electric plug contact 104*a* and the electric plug contact 106*a*, which are connected to the circuit board 72*a* via the connection line 78*a* and the connection line 80*a*, form a second conductor pair. Due to the above-described arrangement of the connection lines 74*a*, 76*a*, 78*a*, 80*a* with connection paths 126*a*, 128*a* that are at least substantially perpendicular to each other, cross-talk between the first conductor pair and the second conductor pair can be reduced in the operating state of the plug connector device 10*a*.

Figure 7:
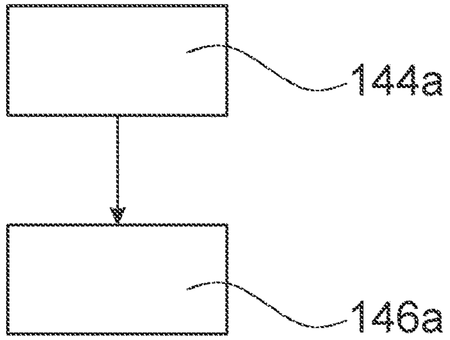

FIG. 7 shows a schematic flow chart of a method for a field assembly of the electric cable 26*a* (see FIG. 2) with the plug connector device 10*a*. In the method at least one conductor core 24*a* of the electric cable 26*a* is connected to at least one electric plug contact 18*a*, 102*a*, 104*a*, 106*a* of the contact unit 16*a*. The method comprises at least two method steps. In a first method step 144*a* a cable preparation of the electric cable 26*a* is carried out; herein firstly the conductor cores 24*a* of the electric cable 26*a* are introduced into the wiring block 22*a* (see FIG. 3). After this the shield contacting is brought about between the shield contact 40*a* (see FIG. 3) and the cable shield 42*a* (see FIG. 2) in the first method step 144*a*. In the first method step 144*a* then the connection to the at least one further element 30*a*, which is different from a conductor core 24*a*, is created by means of the connection unit 28*a* (see FIG. 3), thus obtaining the strain relief of the cable 26*a*. In a second method step 146*a* of the method, the connection between the wiring block 22*a* and the contact unit 16*a* is established in a tool-less manner; this is done via the wiring assistance unit 32*a* (see FIGS. 4 and 5). Herein the conductor cores 24*a* are clamped into the insulation displacement contacts 124*a* of the contact unit 16*a* (see FIG. 6) in such a way that the core sheaths 130*a* encompassing the conductor cores 24*a* (see FIG. 2) are severed. In this way the conductor cores 24*a* are connected in an electrically conductive manner to the corresponding plug contacts 18*a*, 102*a*, 104*a*, 106*a* by the insulation displacement contacts 124*a* via the circuit board 72*a* and via the connection lines 74*a*, 76*a*, 78*a*, 80*a*.

In FIGS. 8 to 14 three further exemplary embodiments of the invention are shown. The following descriptions and the drawings are essentially limited to the differences between the exemplary embodiments, wherein regarding components having the same denomination, in particular regarding components having the same reference numerals, the drawings and/or the description of the other exemplary embodiments, in particular of FIGS. 1 to 7, may principally also be referred to. For distinguishing between the exemplary embodiments, the letter a has been added to the reference numerals of the exemplary embodiment of FIGS. 1 to 7. In the exemplary embodiments of FIGS. 8 to 14 the letter a has been substituted by the letters b to d.

FIG. 8 shows a further exemplary embodiment of a plug connector device 10*b* in a schematic illustration. The plug connector device 10*b* comprises a plug connector unit 12*b* for creating a plug connection that extends along a plugging direction 14*b*. The plug connector device 10*b* further comprises a cable receiving unit 20*b*.

The plug connector device 10*b* differs from the plug connector device 10*a* of the preceding exemplary embodiment essentially in regard to an implementation of the cable receiving unit 20*b*. Regarding a construction and a functionality of the plug connector unit 12*b*, the above description of the plug connector device 10*a* of the preceding exemplary embodiment may be referred to.

The cable receiving unit 20*b* comprises a wiring block 22*b* for an accommodation of conductor cores of an electric cable (not shown here, see FIG. 2). The wiring block 22*b* is realized substantially identically to the wiring block 22*a* of the cable receiving unit 20*a* of the preceding exemplary embodiment, which is why at this point the above description of FIGS. 1 to 7 is referred to in regard to the construction and the functionality of the wiring block 22*b*.

The cable receiving unit 20*b* comprises a connection unit 28*b* for creating a connection to at least one further element (not shown here, see FIG. 2) of the electric cable.

Figure 9:
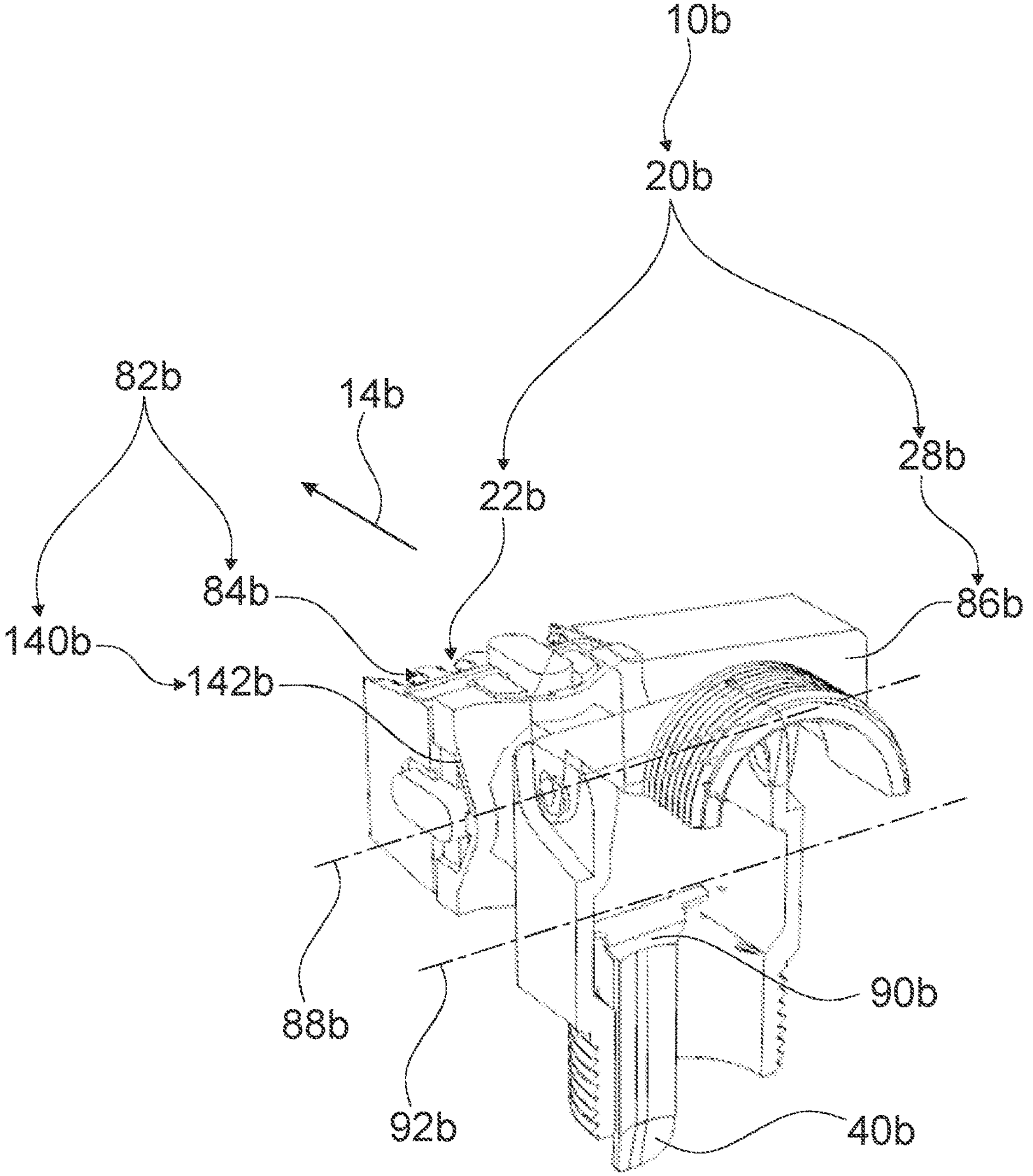

FIG. 9 shows the cable receiving unit 20*b* in a schematic perspective illustration.

The cable receiving unit 20*b* comprises a guiding unit 82*b* for guiding the conductor cores of the electric cable from the connection unit 28*b* into the wiring block 22*b*. The guiding unit 82*b* connects the connection unit 28*b* to the wiring block in an angled fashion. In the present case, the guiding unit 82*b* connects the connection unit 28*b* to the wiring block 22*b* at an angle of at least substantially 90°, wherein angles greater or smaller than 90° would principally also be conceivable.

The guiding unit 82*b* comprises a contact region 84*b* for contacting the wiring block 22*b*. The contact region 84*b* is realized so as to be rotationally symmetrical with respect to the plugging direction 14*b*. The guiding unit 82*b* comprises a slotted link for force transmission 140*b*. The slotted link for force transmission 140*b* comprises a total of four outer contour elements 142*b*, which are arranged on four sides of the guiding unit 82*b*. The outer contour elements 142*b* each have an outer contour having a shape that is at least substantially identical to the shape of the first inner contour 52*a* of the second sub-unit 46*a* of the wiring assistance unit 32*a* of the plug connector device 10*a* of the preceding exemplary embodiment.

The connection unit 28*b* comprises a connection flap 86*b*. To support accessibility to a portion 90*b* of the connection unit 28*b*, the connection flap 86*b* is pivotable around a pivot axis 88*b* that extends perpendicularly to the plugging direction 14*b*.

The portion 90*b* comprises a shield contact 40*b*. To support a shield contacting of the electric cable, the shield contact 40*b* is pivotable around a further pivot axis 92*b* that extends perpendicularly to the plugging direction 14*b*. For a shield contacting with a cable shield of the electric cable (not shown here, see FIG. 2), the shield contact 40*b* is pivotable around the further pivot axis 92*b* such that the shield contact

40*b* is oriented substantially parallel to the plugging direction 14*b*. When the shield contacting has been brought about, the shield contact 40*b*, together with the electric cable, can be pivoted around the further pivot axis 92*b* once again such that the shield contact 40*b* is oriented substantially perpendicularly to the plugging direction 14*b*.

FIG. 10 shows a further exemplary embodiment of a plug connector device 10*c* in a schematic exploded view. The plug connector device 10*c* comprises a plug connector unit 12*c* for establishing a plug connection that extends along a plugging direction 14*c*. The plug connector unit 12*c* includes a contact unit 16*c*. The contact unit 16*c* comprises at least two electric plug contacts 18*c*, 102*c* (see FIG. 12). The plug connector device 10*c* further comprises a cable receiving unit 20*c*.

The cable receiving unit 20*c* comprises a wiring block 22*c* for an accommodation of conductor cores of an electric cable (not shown here, see FIG. 2). The cable receiving unit 20*c* comprises a connection unit 28*c* for creating a connection to a further element (not shown) of the cable that is different from a conductor core, for example a cable jacket of the cable. The wiring block 22*c* is releasably connected to the connection unit 28*c*, namely via a plug connection.

The connection unit 28*c* includes a connection base body 132*c*. The connection base body 132*c* comprises a thread 134*c*. The connection unit 28*c* comprises at least one connection element 94*c*. In contrast to the connection element 94*a* of the connection unit 28*a* of the plug connector device 10*a* of the first exemplary embodiment, the connection element 94*c* is realized as a sleeve-like connection element 94*c*. The sleeve-like connection element 94*c* is configured to engage around the further element of the cable along a circumferential direction and to generate a resistance against a strain load of the cable counter to the plugging direction 14*c*. The connection unit 28*c* comprises a further connection element 136*c*, which comprises a nut 138*c* that corresponds to the thread 134*c*. When the nut 138*c* is screwed onto the thread 134*c*, the sleeve-like connection element 94*c* is pressed onto the further element of the cable, e. g. the cable jacket of the cable, thus generating a considerable resistance against the cable getting pulled out counter to the plugging direction 14*c*. The sleeve-like connection element 94*c* comprises several recesses 182*c*, which are arranged offset from one another along the circumferential direction of the sleeve-like connection element 94*c*. The resistance against the cable getting pulled out counter to the plugging direction 14*c* is further enforced by the recesses 182*c*.

FIG. 11 shows the plug connector device 10*c* in a schematic perspective view. The plug connector device 10*c* comprises a wiring assistance unit 32*c*. The wiring assistance unit 32*c* is configured for a tool-less establishing of a connection between the wiring block 22*c* and the contact unit 16*c*.

The wiring assistance unit 32*c* comprises a first sub-unit 44*c*. The first sub-unit 44*c* is part of the plug connector unit 12*c*. The wiring assistance unit 32*c* comprises a second sub-unit 46*c* which cooperates with the first sub-unit 44*c*. The second sub-unit 46*c* is part of the cable receiving unit 20*c*.

The first sub-unit 44*c* comprises a flap 48*c*. The flap 48*c* is pivotable around a pivot axis 50*c* that extends perpendicularly to the plugging direction 14*c*. The flap 48*c* is configured to provide a force acting in the plugging direction 14*c* for establishing the connection between the wiring block 22*c* and the contact unit 16*c*. The flap 48*c* has at least one first inner contour 52*c*. The first inner contour 52*c* is configured to cooperate with a first outer contour 54*c* of the second sub-unit 46*c*.

The first inner contour 52*c* is configured to lock the connection between the wiring block 22*c* and the contact unit 16*c*. When the connection has been established, the first inner contour 52*c* locks the wiring block 22*c* with the contact unit 16*c* counter to the plugging direction 14*c*.

The first sub-unit 44*c* comprises at least one first guiding cam 60*c* and at least one second guiding cam 64*c*. The second guiding cam 64*c* is arranged offset from the first guiding cam 60*c* in a circumferential direction. The guiding cams 60*c*, 64*c* are configured to engage in corresponding guiding grooves 62*c*, 66*c* of the second sub-unit 46*c*. A first guiding groove 62*c* of the second sub-unit 46*c* corresponds to the first guiding cam 60*c* of the first sub-unit 44*c*. A second guiding groove 66*c* of the second sub-unit 46*c* corresponds to the second guiding cam 64*c* of the first sub-unit 44*c*. In the present exemplary embodiment, the arrangement of the guiding cams 60*c*, 64*c* and the guiding grooves 62*c*, 66*c* are switched relative to the arrangement in the first exemplary embodiment. The guiding grooves 62*c*, 66*c* are in the present case arranged, on opposite-situated sides, in the wiring block 22*c* and the connection base body 132*c*, which are part of the second sub-unit 46*c*. The guiding cams 60*c*, 64*c* are arranged off-center with respect to a height extent 148*c* of the first sub-unit 44*c*. As a result, an anti-twist protection is enabled in assembly and a correct connection between the wiring block 22*c* and the contact unit 16*c* is ensured. In a tool-less establishment of the connection between the wiring block 22*c* and the contact unit 16*c*, the guiding cams 60*c*, 64*c* of the first sub-unit 44*c* engage in the respectively corresponding guiding grooves 62*c*, 66*c* of the second sub-unit 46*c* and are slid into the guiding grooves 62*c*, 66*c* via the force provided by the flap 48*c* counter to the plugging direction 14*c*.

Figure 12C:
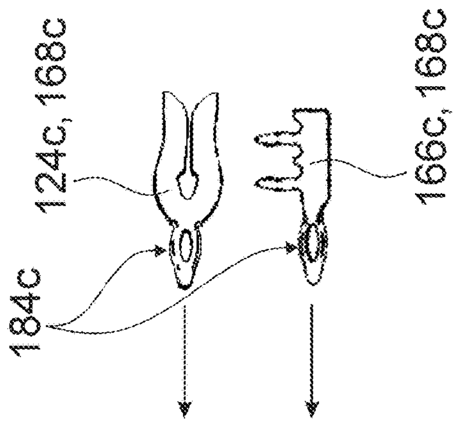
Figure 12B:
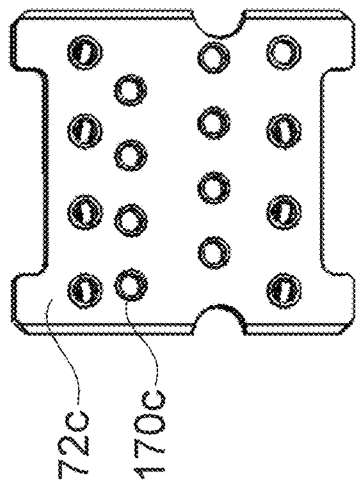
Figure 12A:
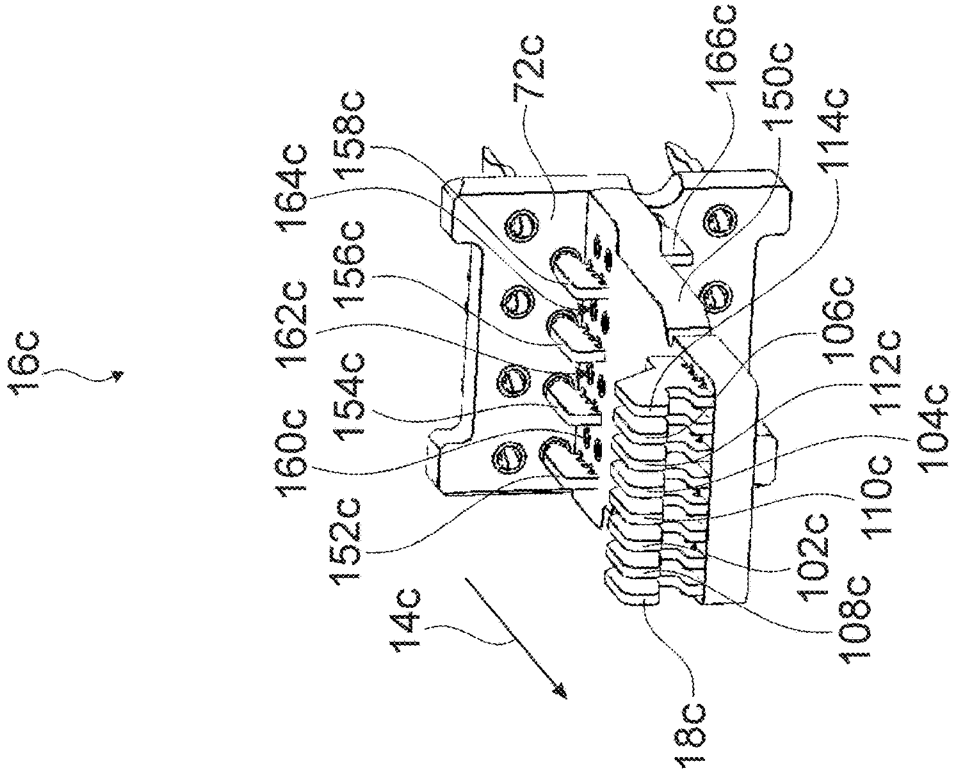

FIG. 12 shows the contact unit 16*c* of the plug connector device 10*c* in three schematic illustrations. In a left-hand illustration the contact unit 16*c* is shown in a schematic perspective view. The contact unit 16*c* comprises at least four electric plug contacts 18*c*, 102*c*, 104*c*, 106*c*. The contact unit 16*c* comprises a circuit board 72*c*. In an assembled state of the contact unit 16*c* within the plug connector unit 12*c*, the circuit board 72*c* is oriented perpendicularly to the plugging direction 14*c*. The contact unit 16*c* comprises at least one further circuit board 150*c*, which is in the assembled state oriented parallel to the plugging direction 14*c*. The circuit board 72*c* and the further circuit board 150*c* are in each case embodied as printed circuit boards.

The contact unit 16*c* comprises, in addition to the four electric plug contacts 18*c*, 102*c*, 104*c*, 106*c*, four further electric plug contacts 108*c*, 110*c*, 112*c*, 114*c*. The electric plug contacts 18*c*, 102*c*, 104*c*, 106*c* and the further electric plug contacts 108*c*, 110*c*, 112*c*, 114*c* are in the assembled state plugged—in an alternating sequence—into the further circuit board 150*c* on an upper side. The contact unit 16*c* moreover comprises four further plug contacts 152*c*, 154*c*, 156*c*, 158*c*, which are in the assembled state plugged into the further circuit board 150*c* on its upper side opposite the electric plug contacts 18*c*, 102*c*, 104*c*, 106*c*. Respectively one of the electric plug contacts 18*c*, 102*c*, 104*c*, 106*c* is electrically conductively connected to respectively one of the further plug contacts 152*c*, 154*c*, 156*c*, 158*c* via a conductor path in the further circuit board 150*c*. The contact unit 16*c* furthermore comprises four further plug contacts 160*c*, 162*c*, 164*c*, 166*c*, which are in the assembled state plugged into the further circuit board 150*c* on its underside.

Respectively one of the further electric plug contacts 108*c*, 110*c*, 112*c*, 114*c* is electrically conductively connected to respectively one of the further plug contacts 160*c*, 162*c*, 164*c*, 166*c* via a conductor path in the further circuit board 150*c*.

The contact unit 16*c* comprises at least one EON plug contact 168*c*, which is in the assembled state pressed into the circuit board 72*c*. In the present case, the further plug contacts 152*c*, 154*c*, 156*c*, 158*c* and the further plug contacts 160*c*, 162*c*, 164*c*, 166*c* are in each case realized as EON plug contacts 168*c*.

A middle schematic illustration of FIG. 12 shows the circuit board 72*c* in a lateral view in a view direction counter to the plugging direction 14*c*. The circuit board 72*c* comprises sixteen metallized pass-through openings 170*c*. The further plug contacts 152*c*, 154*c*, 156*c*, 158*c*, 160*c*, 162*c*, 164*c*, 166*c*, realized as EON plug contacts 168*c*, in each case have press-fit zones 184*c*. In a right-hand illustration of FIG. 12 the further plug contact 166*c* with a press-fit zone 184*c* is schematically shown by way of example. In the assembled state, the press-fit zones 184*c* are pressed into the circuit board 72*c*, thus connecting the further circuit board 150*c* to the circuit board 72*c*.

The contact unit 16*c* comprises a plurality of insulation displacement contacts 124*c*, which are connected to the circuit board 72*c*. The insulation displacement contacts 124*c* are also realized as EON plug contacts 168*c* and have a press-fit zone 184*c* for plugging into one of the metallized pass-through openings 170*c*. In the present case, the contact unit 16*c* comprises eight insulation displacement contacts 124*c* in total. In the right-hand illustration of FIG. 12 one of the insulation displacement contacts 124*c* is shown exemplarily. Regarding the functionality of the insulation displacement contacts 124*c*, the above description of FIG. 6 concerning the contact unit 16*a* of the first exemplary embodiment may be referred to.

FIG. 13 shows a further exemplary embodiment of a plug connector device 10*d* in a schematic view. The plug connector device 10*d* comprises a plug connector unit 12*d* for creating a plug connection that extends along a plugging direction 14*d*. The plug connector device 10*d* further comprises a cable receiving unit 20*d*.

The plug connector device 10*d* differs from the plug connector devices 10*a-c* of the preceding exemplary embodiments essentially in regard to an implementation of the cable receiving unit 20*d*.

The cable receiving unit 20*d* comprises a wiring block 22*d* (see FIG. 14) for an accommodation of conductor cores of an electric cable (not shown here, see FIG. 2). The wiring block 22*d* is implemented substantially identically to the wiring block 22*c* of the cable receiving unit 20*c* of the preceding exemplary embodiment.

The cable receiving unit 20*d* comprises a connection unit 28*d* for creating a connection to at least one further element (not shown here, see FIG. 2) of the electric cable.

Figure 14:
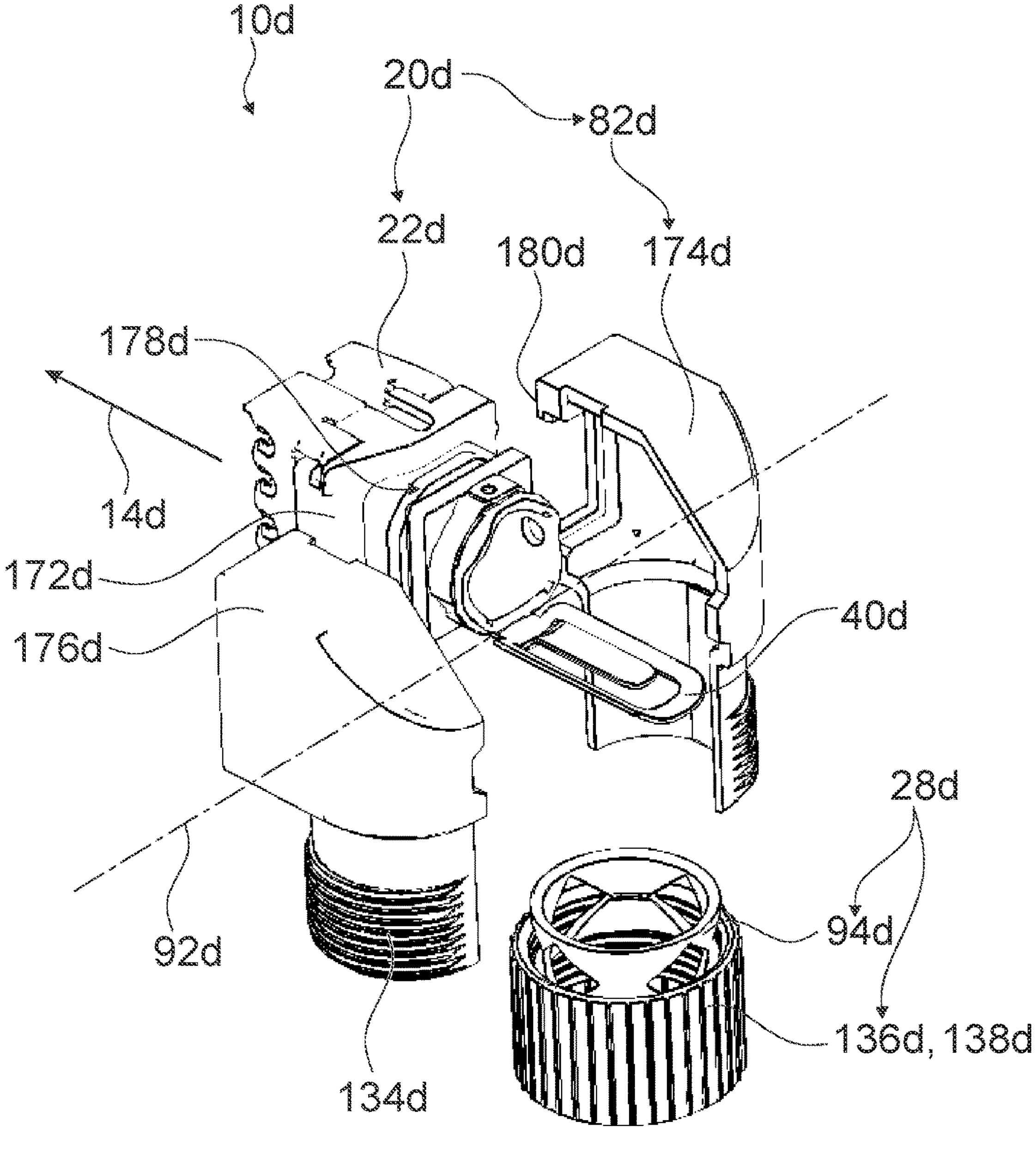

FIG. 14 shows the cable receiving unit 20*d* in a schematic exploded view.

The cable receiving unit 20*d* comprises a guiding unit 82*d* for guiding the conductor cores of the electric cable from the connection unit 28*d* into the wiring block 22*d*. The guiding unit 82*d* connects the connection unit 82*d* to the wiring block 22*d* in an angled fashion.

Differently than in the second exemplary embodiment illustrated in FIGS. 8 and 9, the guiding unit 82*d* is realized in a multi-part implementation. The guiding unit 82*d* comprises a guiding base body 172*d*, which is oriented parallel to the plugging direction 14*d*, and two deflection elements 174*d*, 176*d* for an angled connection of the connection unit 28*d* to the wiring block 22*d*.

In an assembled state of the plug connector device 10*d*, the guiding base body 172*d* is connected to the wiring block 22*d* in the plugging direction 14*d*.

The deflection elements 174*d*, 176*d* are realized as corresponding half-shells and are configured for establishing a form-fit connection to the guiding base body 172*d*. The guiding base body 172*d* has on its rear side, opposed to the plugging direction 14*d*, a circumferential groove 178*d*. For the purpose of establishing the form-fit connection, latch edges 180*d* of the deflection elements 174*d*, 176*d* can be slid into the circumferential groove 178*d*.

The plug connector device 10*d* comprises a shield contact 40*d*, which is rotatably connected to the guiding base body 172*d* and is latchable in at least four positions. In the present case, the shield contact 40*d* is rotatable by 360°. The guiding base body 172*d* has four latch grooves (not shown), which are respectively arranged offset from each other by 90° and which the shield contact 40*d* can be latched into depending on a desired position. Like in the exemplary embodiment depicted in FIGS. 8 and 9, the shield contact 40*d* is pivotable around a further pivot axis 92*d* that extends perpendicularly to the plugging direction 14*d*.

For an assembly of the cable receiving unit 20*d*, the shield contact 40*d* is connected to the guiding base body 172*d*; it is rotated into the desired position and is latched in this position into one of the latch grooves of the guiding base body 172*d*. Then the shield contact 40*d* is pivoted around the further pivot axis 92*d*. After that, the conductor cores of the electric cable are connected to the wiring block 22*d*. Then the deflection elements 174*d*, 176*d*, which are realized as half-shells, are slid with their respective latch edges 180*d* into the circumferential groove 178*d*.

In the slid-in state, the deflection elements 174*d*, 176*d* together form a thread 134*d*. Analogously to the preceding exemplary embodiments, the connection unit 28*d* includes a further connection element 136*d*, which comprises a nut 138*d* that corresponds to the thread 134*d*. For a fixation of the deflection elements 174*d*, 176*d* in the slid-in state, the further connection element 136*d* is screwed onto the thread 134*d*. Analogously to the preceding exemplary embodiment, the connection unit 28*d* comprises a sleeve-like connection element 94*d*, which is configured to engage around a further element of the cable along a circumferential direction. Differently than in the preceding exemplary embodiment, the sleeve-like connection element 94*d* is configured to generate a resistance against a tensile load of the cable perpendicularly to the plugging direction 14*d*.

FIG. 13 exemplarily shows the plug connector device 10*d* with the cable receiving unit 20*d* in an assembled state in a first position, wherein the connection unit 28*d* is connected to the wiring block 22*d* (see FIG. 14) by means of the guiding unit 82*d* in an angled fashion, at an angle of 90°, and is oriented leftwards by means of the guiding unit 82*d*. Alternatively, the connection unit 28*d* is connectable to the wiring block 22*d* by means of the guiding unit 82*d* in an angled fashion in at least three further positions, these positions being in each case oriented perpendicularly to the plugging direction 14*d*. Relative to the first position shown in FIG. 13, the connection unit 28*d* would in a second position be rotated clockwise by 90° and would be oriented upwards, in a third position it would be rotated clockwise by 180° and would be oriented rightwards, and in a fourth position it would be rotated clockwise by 270° and would be oriented downwards (not shown).

REFERENCE NUMERALS 10 plug connector device
12 plug connector unit
14 plugging direction
16 contact unit
18 electric plug contact
20 cable receiving unit
22 wiring block
24 conductor core
26 electric cable
28 connection unit
30 further element
32 wiring assistance unit
34 plug element
36 housing
38 cable jacket
40 shield contact
42 cable shield
44 first sub-unit
46 second sub-unit
48 flap
50 pivot axis
52 first inner contour
54 first outer contour
56 second inner contour
58 second outer contour
60 first guiding cam
62 first guiding groove
64 second guiding cam
66 second guiding groove
68 width extension
70 width extension
72 circuit board
74 connection line
76 connection line
78 connection line
80 connection line
82 guiding unit
84 contact region
86 connection flap
88 pivot axis
90 portion
92 further pivot axis
94 element
96 lamella
98 direction
100 plug connector kit
102 electric plug contact
104 electric plug contact
106 electric plug contact
108 further electric plug contact
110 further electric plug contact
112 further electric plug contact
114 further electric plug contact
116 further connection line
118 further connection line
120 further connection line
122 further connection line
124 insulation displacement contact
126 first connection path
128 second connection path
130 core sheath
132 connection base body
134 thread
136 further connection element
138 nut
140 slotted link for force transmission
142 outer contour element
144 first method step
146 second method step
148 height extent
150 further circuit board
152 further electric plug contact
154 further electric plug contact
156 further electric plug contact
158 further electric plug contact
160 further electric plug contact
162 further electric plug contact
164 further electric plug contact
166 further electric plug contact
168 EON plug contact
170 metallized pass-through opening
172 guiding base body
174 deflection element
176 deflection element
178 circumferential groove
180 latch edge
182 recess
184 press-fit zone

The invention claimed is:

1. A plug connector device, in particular an RJ plug connector device, with a plug connector unit which is configured to create a plug connection extending along a plugging direction and which comprises a contact unit with at least two electric plug contacts, the plug connector device comprising a cable receiving unit comprising a wiring block for an accommodation of conductor cores of an electric cable and comprising a connection unit for creating a connection to at least one further element of the cable that is different from a conductor core, and comprising a wiring assistance unit, which is configured for a tool-less establishing of a connection between the wiring block and the contact unit, wherein the connection unit comprises a strain relief for a cable jacket of the cable, wherein the connection unit comprises a shield contact for contacting a cable shield of the cable to generate a shield contacting before the connection between the wiring block and the contact unit is brought about, wherein the connection unit comprises at least one connection element, wherein the strain relief is provided via the at least one connection element of the connection unit, and wherein the at least one connection element is configured for creating the connection to the cable jacket of the cable.

2. The plug connector device according to claim 1, wherein the plug connector unit comprises a plug element for an insertion into a plug socket.

3. The plug connector device according to claim 1, wherein the wiring assistance unit comprises a first sub-unit, which is part of the plug connector unit, and a second sub-unit which cooperates with the first sub-unit and is part of the cable receiving unit.

4. The plug connector device according to claim 3, wherein the first sub-unit comprises a flap, which is pivotable around a pivot axis extending perpendicularly to the plugging direction and is configured to provide a force acting in the plugging direction for establishing the connection between the wiring block and the contact unit.

5. The plug connector device according to claim 4, wherein the flap has at least one first inner contour, which is configured to cooperate with a first outer contour of the second sub-unit.

6. The plug connector device according to claim 4, wherein the flap has at least one first inner contour, which is configured to cooperate with a first outer contour of the second sub-unit, and which is configured to lock the connection between the wiring block and the contact unit.

7. The plug connector device according to claim 3, wherein the first sub-unit comprises at least one first guiding cam and at least one second guiding cam which is arranged offset from the first guiding cam in a circumferential direction, the guiding cams being configured to engage into corresponding grooves of the second sub-unit.

8. The plug connector device according to claim 7, wherein the guiding cams are arranged off-center with respect to a height extent of the first sub-unit.

9. The plug connector device according to claim 1, including the cable receiving unit comprising the wiring block for an accommodation of conductor cores of the electric cable, and comprising the connection unit for creating a connection to the at least one further element of the cable that is different from a conductor core, wherein the cable receiving unit comprises a guiding unit for a guidance of the conductor cores from the connection unit into the wiring block, the guiding unit connecting the connection unit to the wiring block in an angled fashion.

10. The plug connector device according to claim 9, wherein the guiding unit is realized in multi-part fashion and comprises a guiding base body, which is oriented parallel to the plugging direction, as well as at least two deflection elements for an angled connection of the connection unit to the wiring block.

11. The plug connector device according to claim 10, wherein the deflection elements are realized as corresponding half-shells and are configured for establishing a form-fit connection to the guiding base body.

12. The plug connector device according to claim 10, comprising a shield contact, which is rotatably connected to the guiding base body and is latchable in at least four positions.

13. The plug connector device according to claim 1, including the cable receiving unit, which comprises the wiring block for an accommodation of conductor cores of the electric cable and comprises the connection unit for creating a connection to the at least one further element of the cable which is different from a conductor core, wherein the connection unit comprises at least one sleeve-like connection element, which is configured to engage around the further element of the cable along a circumferential direction and to generate a resistance against a tensile load of the cable counter to the plugging direction.

14. A plug connector kit for producing a plug connector device according to claim 1, with the plug connector unit and with the cable receiving unit.

15. A method for field assembly of an electric cable with a plug connector device according to claim 1, wherein at least one conductor core of the electric cable is connected to at least one electric plug contact of the contact unit.

16. A plug connector device, in particular an RJ plug connector device, with a plug connector unit which is configured to create a plug connection extending along a plugging direction and which comprises a contact unit with at least two electric plug contacts, including a cable receiving unit, which comprises a wiring block for an accommodation of conductor cores of an electric cable and comprises a connection unit for creating a connection to at least one further element of the cable which is different from a conductor core, wherein the connection unit comprises at least one sleeve-like connection element, which is configured to engage around the further element of the cable along a circumferential direction and to generate a resistance against a tensile load of the cable counter to the plugging direction, wherein the connection unit comprises a connection element and a further connection element, which act together for creating the connection to the at least one further element of the cable that is different from a conductor core, and wherein the sleeve like connection element is provided to be arranged between the further element of the cable which is different from a conductor core and the further connection element.

17. A plug connector device, in particular an RJ plug connector device, with a plug connector unit which is configured to create a plug connection extending along a plugging direction and which comprises a contact unit with at least two electric plug contacts, the plug connector device comprising a cable receiving unit comprising a wiring block for an accommodation of conductor cores of an electric cable and comprising a connection unit for creating a connection to at least one further element of the cable that is different from a conductor core, and comprising a wiring assistance unit, which is configured for a tool-less establishing of a connection between the wiring block and the contact unit, wherein the wiring assistance unit comprises a first sub-unit, which is part of the plug connector unit, and a second sub-unit which cooperates with the first sub-unit and is part of the cable receiving unit, wherein the first sub-unit comprises at least one first guiding cam and at least one second guiding cam which is arranged offset from the first guiding cam in a circumferential direction, the guiding cams being configured to engage into corresponding grooves of the second sub-unit.

* * * * *